United States Patent [19]

Kotler et al.

[11] 4,002,849
[45] Jan. 11, 1977

[54] SCANNING APPARATUS FOR DETECTING AND ANALYZING SUPERVISORY AND SIGNALING INFORMATION

[75] Inventors: Frederick Kotler, Needham, Mass.; David A. Zlotek, Nashua, N.H.

[73] Assignee: GTE Sylvania Incorporated, Stamford, Conn.

[22] Filed: Oct. 14, 1975

[21] Appl. No.: 621,771

[52] U.S. Cl. .................... 179/18 EB; 179/18 FG
[51] Int. Cl.² ........................................ H04M 3/22
[58] Field of Search ....... 179/18 FG, 18 FF, 18 EB, 179/18 DA

[56] References Cited
UNITED STATES PATENTS

| | | | |
|---|---|---|---|
| 3,671,677 | 6/1972 | Lee, Jr. et al. | 175/18 DA |
| 3,851,110 | 11/1974 | Kelly et al. | 179/18 EB |
| 3,894,191 | 7/1975 | Sassa | 179/18 FG |

Primary Examiner—Thomas W. Brown
Attorney, Agent, or Firm—David M. Keay; Elmer J. Nealon; Norman J. O'Malley

[57] ABSTRACT

Scanning apparatus for monitoring 88 telephone subscriber lines to detect the on hook or off hook condition of the lines and to detect and count dial pulses. A multiplexing arrangement produces a sample of the incoming signal on each subscriber line in a recurring sequence. The apparatus includes a memory for storing an indication for each subscriber line as either on hook or off hook, a memory for storing the most recent sample for each subscriber line, a memory in association with a counter for storing dial pulse count information for each subscriber line, and a memory in association with a timer for storing timing information for each subscriber line. The multiplexing arrangement and the memories are coupled to a decision section of an arrangement of logic decision blocks which analyze each sample together with the stored data associated with the same subscriber line. Depending upon the particular combination of information presented to the decision section one of several end-state flip-flops is set. Depending upon which end-state flip-flop is set a subroutines section of logic elements updates the contents of the memories. If appropriate, the subroutines section causes an output buffer to report a change in the status of a subscriber line to an on hook or off hook condition and causes another output buffer to report a count of the number of dial pulses for a dialed digit after all the pulses for the digit have been counted.

14 Claims, 15 Drawing Figures

TRUTH TABLE
(POSITIVE LOGIC)

| QI | ENABLE | YES | NO |
|----|--------|-----|-----|
| 0  | 0      | 0   | 0   |
| 1  | 0      | 0   | 0   |
| 0  | 1      | 0   | 1   |
| 1  | 1      | 1   | 0   |

SCANNING APPARATUS FOR DETECTING AND ANALYZING SUPERVISORY AND SIGNALING INFORMATION

BACKGROUND OF THE INVENTION

This invention relates to scanning apparatus for monitoring telephone subscriber lines. More particularly, it is concerned with apparatus for scanning telephone subscriber lines to detect supervisory signals and to detect and count dial pulse signals.

In telephone communication systems having common control systems it is the usual practice to separate the detection of supervisory information on the on hook or off hook status of subscriber lines from the signaling information as provided for example, by dial pulse signals. Supervisory detection in these systems is performed by monitoring the conditions of slow releasing holding relays, or their electronic equivalents, and reporting the state of each holding relay to the common control. The scanner in systems of this nature performs only a sensing and reporting function, and the supervisory condition of every line (either on hook or off hook) is reported to the common control on each and every scanning cycle.

Dial pulse signaling information is detected by connecting a subscriber line to one of a set of pooled dial pulse register-senders. A register-sender is connected to a line only during the signaling portion of a call. After the complete address in dial pulses has been received, the dial pulse register-sender is released and additional dial pulse signaling by the subscriber is not possible. Since certain types of switching equipment begin outpulsing immediately after circuit seizure, some exchanges employ a special matrix stage called bylinks to connect incoming lines to dial pulse register-senders in order to minimize the connection delay and insure that all dialed digits are detected properly. In some exchanges, rather than employing the bylink arrangement, the first digit or digit pulse is stored to provide sufficient time for a path through the switching matrix to be established.

In common control systems as described the supervisory condition of each subscriber line is reported on during each scanning cycle regardless of whether or not a change has occurred. The input-output channel between the subscriber network and the common control network thus carries large amounts of redundant data. In addition the common control wastes processing time analyzing the redundant data. Systems of this type also require a pool of dial pulse register-senders to detect and process the dial pulse signaling. In addition, in order to insure the detection of all dial pulse signals from certain types of switching equipment either a special bylink matrix or arrangement for storing the first dial pulse information is required.

Furthermore, in systems of the type described the dial pulse register-sender employed during the address portion of a call is released after the dial pulse information has been received. Thus, no capability is provided for the subscriber to signal the exchange once the address information has been dialed.

SUMMARY OF THE INVENTION

Apparatus in accordance with the present invention recognizes transitions between two signaling levels to detect supervisory information (on hook and off hook conditions) and to detect dial pulse signaling information at any time during a call. Apparatus for detecting and counting the dial pulses includes means for receiving an incoming signal which is at a first level with pulses at a second level. (The first level is the level in the off hook condition and the second level is the level in the on hook condition.) A sampling means periodically samples an incoming signal and determines whether the sample is at the first or the second level. A sample memory means is employed to store the most recent previous sample. A digit counting means records a count in response to the presence of a sample at the second level when the most recent sample stored in the sample memory means is at the first level thus providing a count on the leading edge of each pulse.

A timing means accumulates a count of the samples received at the first level. The timing means is cleared of any accumulated count in response to the presence of a sample at the first level when the most recent sample stored in the sample memory means is at the second level. That is, the timing means is cleared on the trailing edge of a pulse prior to accumulating a count of samples at the first level. The count accumulated in the digit counting means is read out by a readout means when a predetermined accumulated count is present in the timing means. The predetermined count is such as to permit sufficient time to elapse since the trailing edge of the last pulse in order to insure that all the pulses of a digit have been received. The digit counting means is cleared of the accumulated count subsequent to the reading out of the accumulated count by the readout means. Thus, a count of the number of pulses at the second level occurring prior to a period at the first level sufficiently long for the timing means to accumulate a count equal to the predetermined count is produced by the readout means.

BRIEF DESCRIPTION OF THE DRAWINGS

Additional objects, features, and advantages of apparatus in accordance with the present invention will be apparent from the following detailed discussion together with the accompanying drawings wherein.

Standard well-known symbols and notations are employed throughout the drawings to designate the various logic components.

DETAILED DESCRIPTION OF THE INVENTION

General

Figure 1:
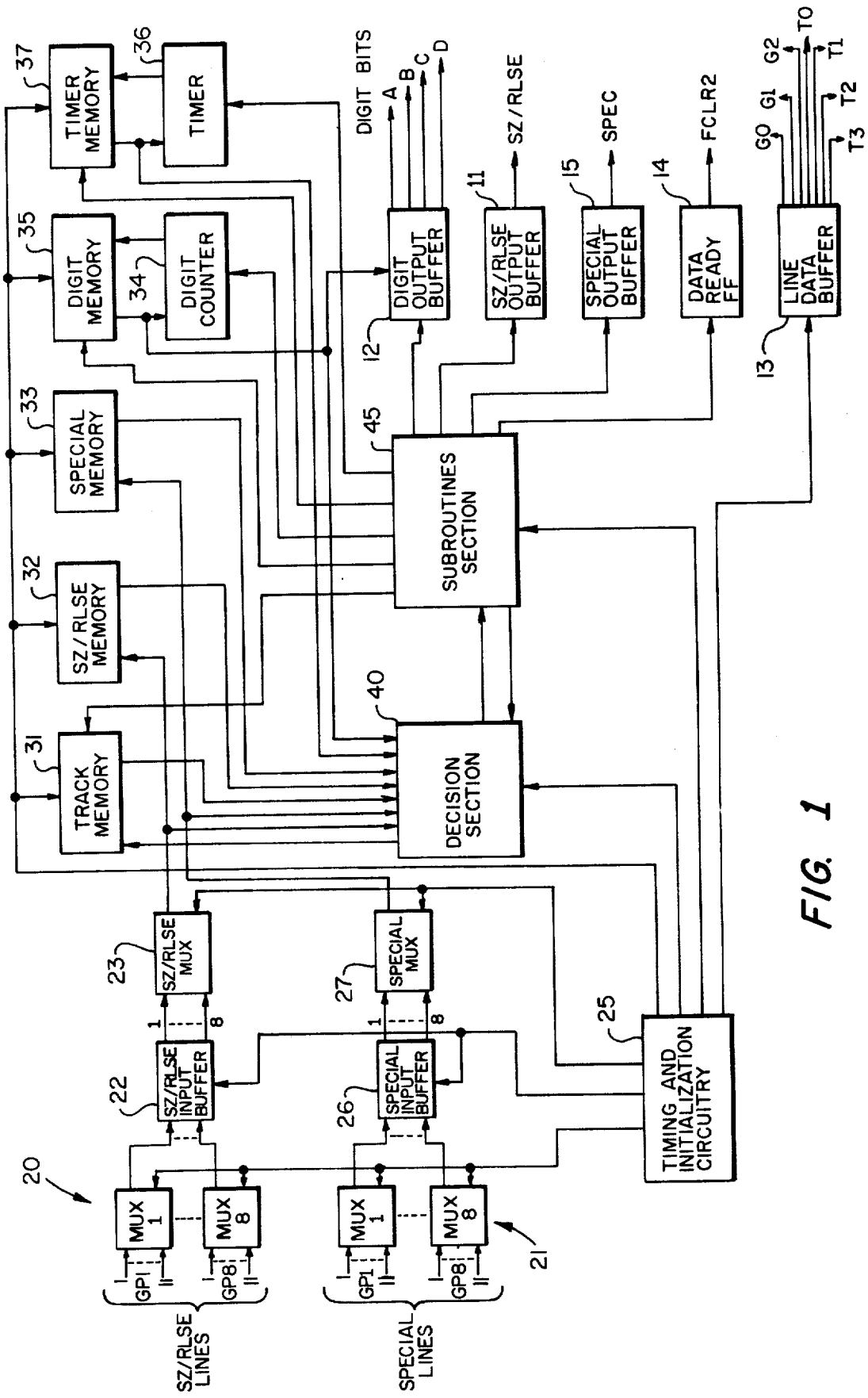
FIG. 1 is a block diagram of scanning apparatus in accordance with the present invention for detecting and reporting supervisory information and for detecting and counting dial pulse signaling information.

Scanning apparatus in accordance with the present invention is illustrated in the block diagram of FIG. 1. In the specific embodiment under discussion 88 subscriber lines are arranged in eight groups of eleven lines each, labeled SZ/RLSE lines. Each subscriber line has associated therewith a SPECIAL line. The SPECIAL lines are also arranged in eight groups of 11 lines each. The scanning apparatus operates to detect and report changes in the supervisory condition of each of the SZ/RLSE lines between the on hook and off hook conditions. The apparatus also detects and counts dial pulses on the SZ/RLSE lines and reports the number of dial pulses for each digit in binary format. The apparatus also detects and reports the presence of signals on the SPECIAL lines As is the usual practice each dialed digit is represented by a series of pulses, the number of pulses in the series being equal to the value of the digit. Each pulse is approximately 60 milliseconds long with a spacing between pulses of the same digit of approximately 40 milliseconds. The interdigit spacing between the last pulse of one digit and the first pulse of the next digit is a mimimum of 120 milliseconds.

The eleven SZ/RLSE lines of each group are connected to the input terminals of one of a set of eight input multiplexers 20. The SPECIAL lines are similarly connected to the input terminals of a set of eight multiplexers 21. The eight outputs of the input multiplexers 20 are applied to a SZ/RLSE input buffer 22 and the eight outputs of the buffer 22 are applied to a SZ/RLSE multiplexer 23. The input multiplexers 20, the SZ/RLSE input buffer 22, and the SZ/RLSE multiplexer 23 are controlled by timing and initialization circuitry 25. This arrangement samples each of the 88 SZ/RLSE lines every 19.6 milliseconds. The resulting sample period for each bit at the output of the SZ/RLSE multiplexer 23 is 222.2 microseconds, a bit rate of 4500 Hz.

Similarly, a SPECIAL input buffer 26 is connected to the outputs of the eight input multiplexers 21 and a SPECIAL multiplexer 27 is connected to the eight outputs of the SPECIAL input buffer 26. The input multiplexers 21, buffer 26, and multiplexer 27 are operated in parallel with the SZ/RLSE arrangement by the timing and initialization circuitry 25.

The scanning apparatus includes several random access memories. A track memory 31 stores data on the on hook or off hook supervisory conditon of each SZ/RLSE line. An SZ/RLSE memory 32 stores the most recent sample bit from each SZ/RLSE line and a SPECIAL memory 33 stores the most recent sample bit from each SPECIAL line. The apparatus also includes a digit memory 35 which stores pulse counting data for each SZ/RLSE line as determined by a digit counter 34. A timer memory 37 stores timing data for each SZ/RLSE line as determined by a timer 36.

A decision section 40 has inputs from the SZ/RLSE multiplexer 23, the SPECIAL multiplexer 27, the track memory 31, the SZ/RLSE memory 32, the SPECIAL memory 33, the digit memory 35, and the timer memory 37. During the time slot of each sample period, under control of the timing and initialization circuitry 25, the decision section 40 receives data at its inputs relating to one of the SZ/RLSE lines and also to its corresponding SPECIAL line. The data is analyzed by the decision section 40 which produces an output appropriate to the particular combination of data to a subroutines section 45. Depending upon the particular input received from the decision section 40 the subroutines section 45, under control of the timing and initialization circuitry 25, executes a particular subroutine. The subroutine causes appropriate actions to be taken by the digit counter 34 and timer 36 and appropriate data to be stored in the memories.

Certain subroutines operate output buffers connected to the subroutines section 45 to provide output data. When the supervisory condition of a SZ/RLSE line changes, a SZ/RLSE output buffer 11 produces a SZ/RLSE signal to indicate either an off hook or on hook condition. If a signal is present on a SPECIAL line, a SPECIAL output buffer 15 produces a SPEC signal. When all the dial pulses for a digit have been received, a digit output buffer 12 produces DIGIT BITS A–D indicating the value of the digit in binary form. When output data is available in one of the output buffers 11, 15, or 12, a data ready flip-flop 14 which is also connected to the subroutines section 345 is set to produce an FCLR2 signal. A line data buffer 13 controlled by the timing and initialization circuitry 25 produces line identifying signals GO–G2 and TO–T3 identifying the particular SZ/RLSE or SPECIAL line with which the output data is associated.

Timing and Input Sampling

Figure 5:
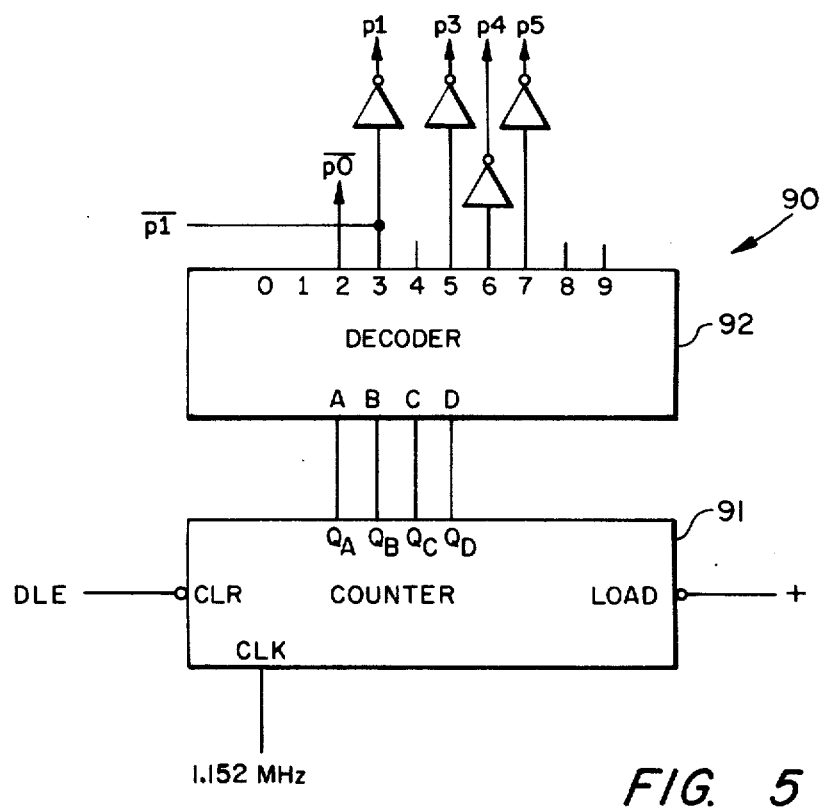
FIG. 5 is a logic diagram of another portion of the timing circuitry.
Figure 3:
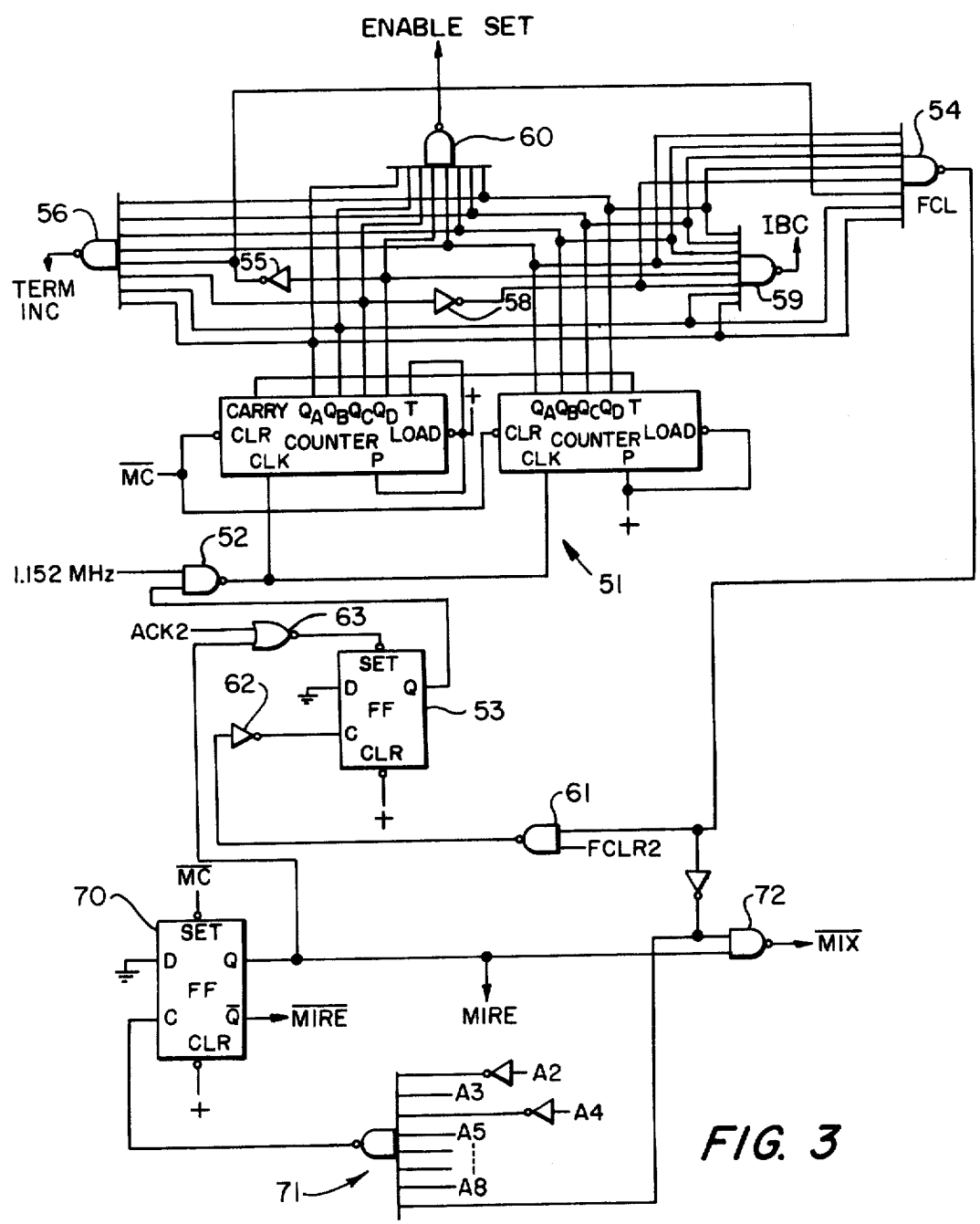
FIG. 3 is a logic diagram of a portion of timing and initialization circuitry employed in the scanning apparatus.
Figure 4:
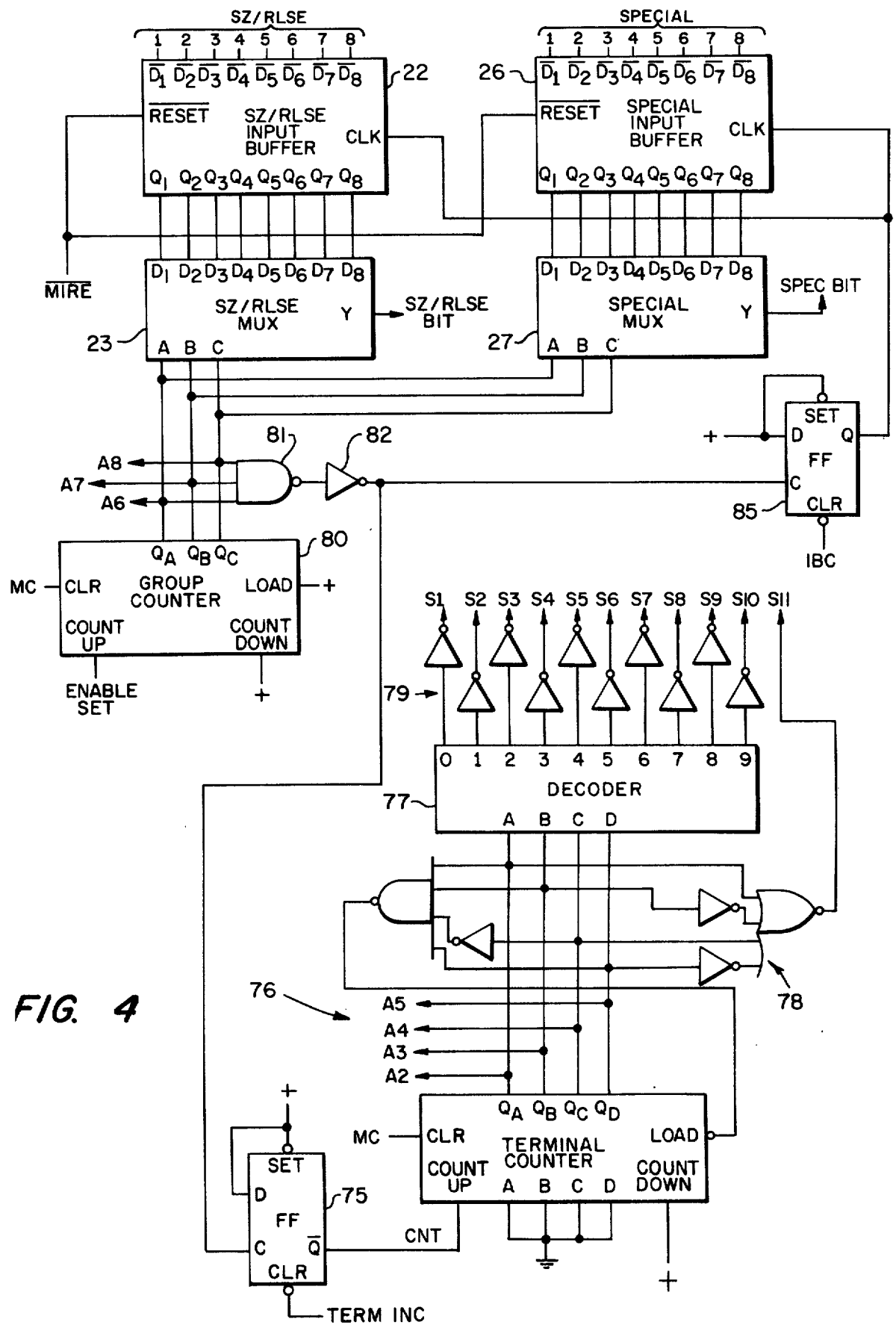
FIG. 4 is a logic diagram of other portions of the timing circuitry together with input buffers and multiplexers.

Timing and control of the operation of the apparatus is provided by the timing and initialization circuitry 25 different portions of which are illustrated in FIGS. 3, 4, and 5. FIG. 3 shows the basic timer 51 which is a counter arrangement for repeatedly counting through a cycle of 256 clock pulses. Squarewave clock pulses at a frequency of 1.152 MHz are applied to the basic timer 51 by way of a NAND gate 52 unless the NAND gate 52 is inhibited by an output from a D-type flip-flop 53. Outputs of the counter arrangement are connected to NAND gates 54, 56, 59, and 60 by way of inverters 55 and 58. The NAND gate 54 produces an output pulse FCL on the count of 243 during each countng cycle of 256 pulses. The NAND gate 56 produces a pulse TERM INC at each count of 247. A pulse IBC is produced at the output of NAND gate 59 on the count of 251. A pulse ENABLE SET is produced on the 255 count by the NAND gate 60.

The FCL pulse on the count of 243 passes through a NAND gate 61 causing the flip-flop 53 to be reset if an FCLR2 signal is being applied to the NAND gate 61 from the data ready flip-flop 14. If no FCLR2 signal is present, the FCL signal has no effect. While the flip-flop 53 is in the reset condition it inhibits NAND gate 52 from passing the 1.152 MHz clock pulses and the count in the basic timr 51 holds at 243. In normal operation the flip-flop 53 is restored to the set condition by a pulse ACK2 applied through a NOR gate 63. The significance of the FCLR2 and ACK2 signals will be explained in greater detail hereinbelow.

FIG. 3 also shows an initialization flip-flop 70 of the D-type together with other components which execute an initialization routine to clear the memories of any accumulated data in response to a reset signal $\overline{MC}$ as will be explained hereinbelow.

FIG. 4 illustrates a group counter 80 and a terminal counter 76 which operate in response to signals from the basic timer 51 to control the SZ/RLSE and SPECIAL multiplexers 23 and 27 and the two sets of input multiplexers 20 and 21, respectively. The group counter 80 is clocked at a 4500 Hz rate by the ENABLE SET pulses from the basic timer 51. The counter counts repeatedly through a count of eight. The binary outputs from the counter labeled A6, A7, and A8 are applied to both the SZ/RLSE and SPECIAL multiplexers 23 and 27.

The outputs A6–A8 from the group counter 80 are also applied through a NAND gate 81 and inverter 82 to a D-type flip-flop 75. The TERM INC pulse from the basic timer 51 is also applied to the flip-flop 75. The output of the flip-flop 75 is connected to the terminal counter 76 which is a straightforward arrangement of components providing a count-to-11 counter. The flip-flop 75 and its input pulses cause the terminal counter 76 to recored a count at the rate of 562.5 Hz coincident with a 247 count of the basic timer 51.

The binary output lines A2–A5 from the terminal counter 76 are connected to a decoder 77. The decoder 77 through a set of inverters 79 provides decoded outputs S1–S10 of the counts 1–10 from the counter. The count of 11 is decoded by the logic arrangement 78 to provide output S11.

Figure 2:
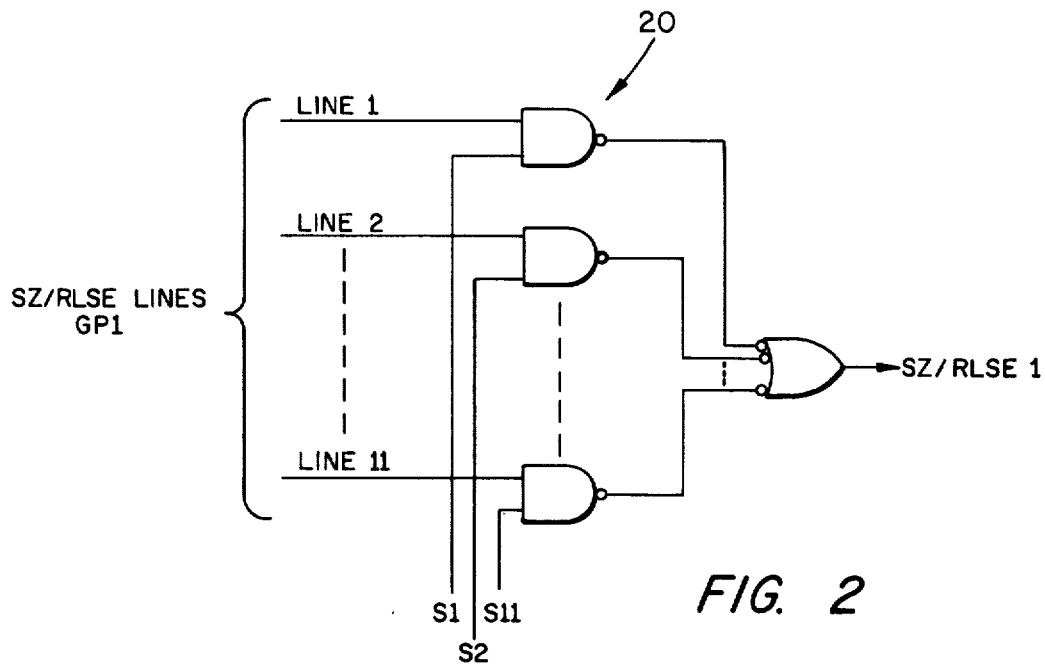
FIG. 2 is a logic diagram of an input multiplexer employed in the scanning apparatus of FIG. 1.

The output lines S1 through S11 of the decoders 79 and 78 are applied in parallel to each of the eight SZ/RLSE lines input multiplexers 20 and to each of the eight SPECIAL lines input multiplexers 21. The input multiplexer for the first group of eleven SZ/RLSE lines, labeled MUX 1 in FIG. 1, is illustrated in FIG. 2. All of the other input multiplexers are a similar arrangement of NAND and negative-OR gates, and all of th input multiplexers operate in parallel. Each input multiplexer produces a time division multiplexed output of the eleven inputs applied thereto. Each line is sampled every 19.6 milliseconds and each output is at a 562.5 Hz bit rate.

The outputs A6–A8 from the group counter 80 are also applied by way of the NAND gate 81 and inverter 82 to the clock input of a D-type flip-flop 85. The clear input to the flip-flop 85 is the IBC signal from the basic timer 51 of FIG. 3. The output of the flip-flop 85 clocks the SZ/RLSE input buffer 22 and the SPECIAL input buffer 26. Thus, flip-flop 85 clocks the input buffers 22 and 26 at a 562.5 Hz rate coincident with a count of 251 in the basic timer 51 to load the samples SZ/RLSE 1 – SZ/RLSE 8 and SPECIAL 1 – SPECIAL 8 into their respective buffers 22 and 26.

The SZ/RLSE multiplexer 23 and the SPECIAL multiplexer 27 are connected to the outputs of the SZ/RLSE input buffer 22 and SPECIAL input buffer 26, respectively. Both multiplexers 23 and 27 are controlled by signals A6–A8 from the group counter 80. The SZ/RLSE and SPECIAL multiplexers 23 and 27 time division multiplex the contents of the input buffers 22 and 26 to produce SZ/RLSE BIT and SPEC BIT samples of the incoming signals on the 88 SZ/RLSE lines and SPECIAL lines, respectively, at a 4500 Hz rate. Thus, the time slot or period for each sample SZ/RLSE BIT or SPEC BIT is 222.2 microseconds.

A clock pulse generator 90 which is another portion of the timing circuitry is illustrated in FIG. 5. The 1.152 MHz squarewave clock pulses are applied to a count-to-16 counter 91. The outputs of the counter are applied to a decoder 92. Counts of 2, 3, 5, 6, and 7 are decoded to produce clock pulses labeled as $\overline{p0}$, p1, p3, p4, and p5, respectively.

Memories

Figure 6:
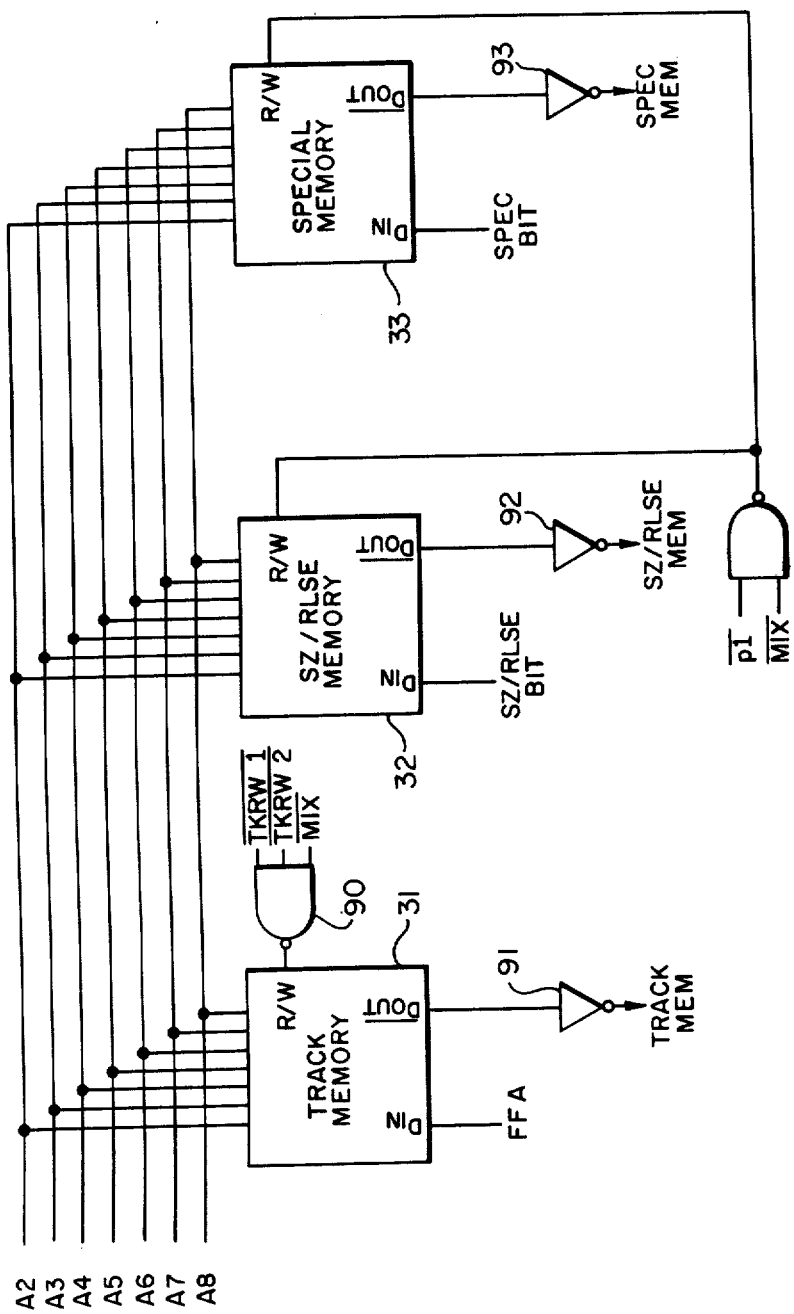
FIG. 6 is a logic diagram of certain memories employed in the apparatus.

FIG. 6 illustrates the track memory 31, the SZ/RLSE memory 32, and the SPECIAL memory 33. Each of the memories has a storage capacity of up to 88 bits, and 88 storage locations are addressed in sequence during each scanning cycle of 19.6 milliseconds by the address data A2–A8 from the terminal and group counters 76 and 80 of FIG. 4.

The data input to the track memory 31 is from the decision section 40 as will be explained hereinbelow. The track memory is caused to write a bit in the memory at the addressed storage location by the presence of a signal from the subroutines section 45 applied through a NAND gate 90. The output TRACK MEM is taken through an inverter 91.

The SZ/RLSE BIT from the SZ/RLSE multiplexer 23 is appplied to the data input of the SZ/RLSE memory 32. The SZ/RLSE memory 32 is caused to write a bit at the addressed storage location on the p1 clock pulse form the clock pulse generator 90. The output SZ/RLSE MEM from the SZ/RLSE memory 32 is through an inverter 92.

The SPECIAL memory 33 has its data input connected to the SPEC BIT output from the special multiplexr 27. Data is written into the memory on the p1 clock pulse. The output labeled SPEC MEM is through an inverter 93.

Figure 7:
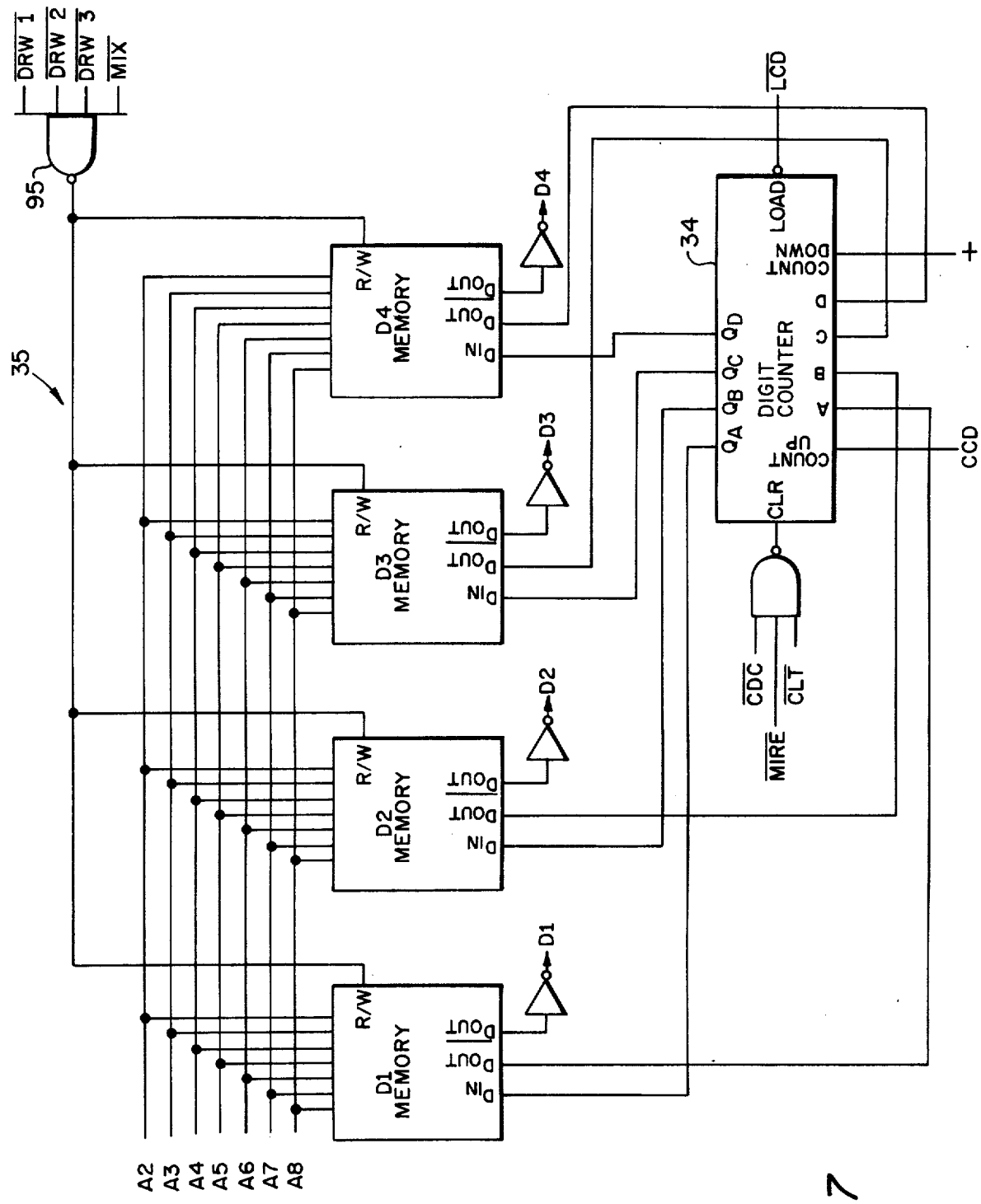
FIG. 7 is a logic diagram of a digit counter and digit memory.

The digit counter 34 and the associated digit memory 35 are illustrated in FIG. 7. The digit counter 34 has several connections to the subroutines section 45. The digit memory 45 includes four separate random access memory units D1–D4 for storing binary digits of up to 4 bits. Each memory unit is similar to those previously discussed and they are addressed by address information A2–A8 from the terminal and group counters 76 and 80 of FIG. 4. The inputs to the digit memory units are from the outputs of the digit counter 34, and the outputs D1–D4 from the memory units are applied to the inputs of the digit counter. The contents of the digit counter 34 is written into the memory 35 in response to a signal from the subroutines section 45 applied through NAND gate 95.

Figure 8:
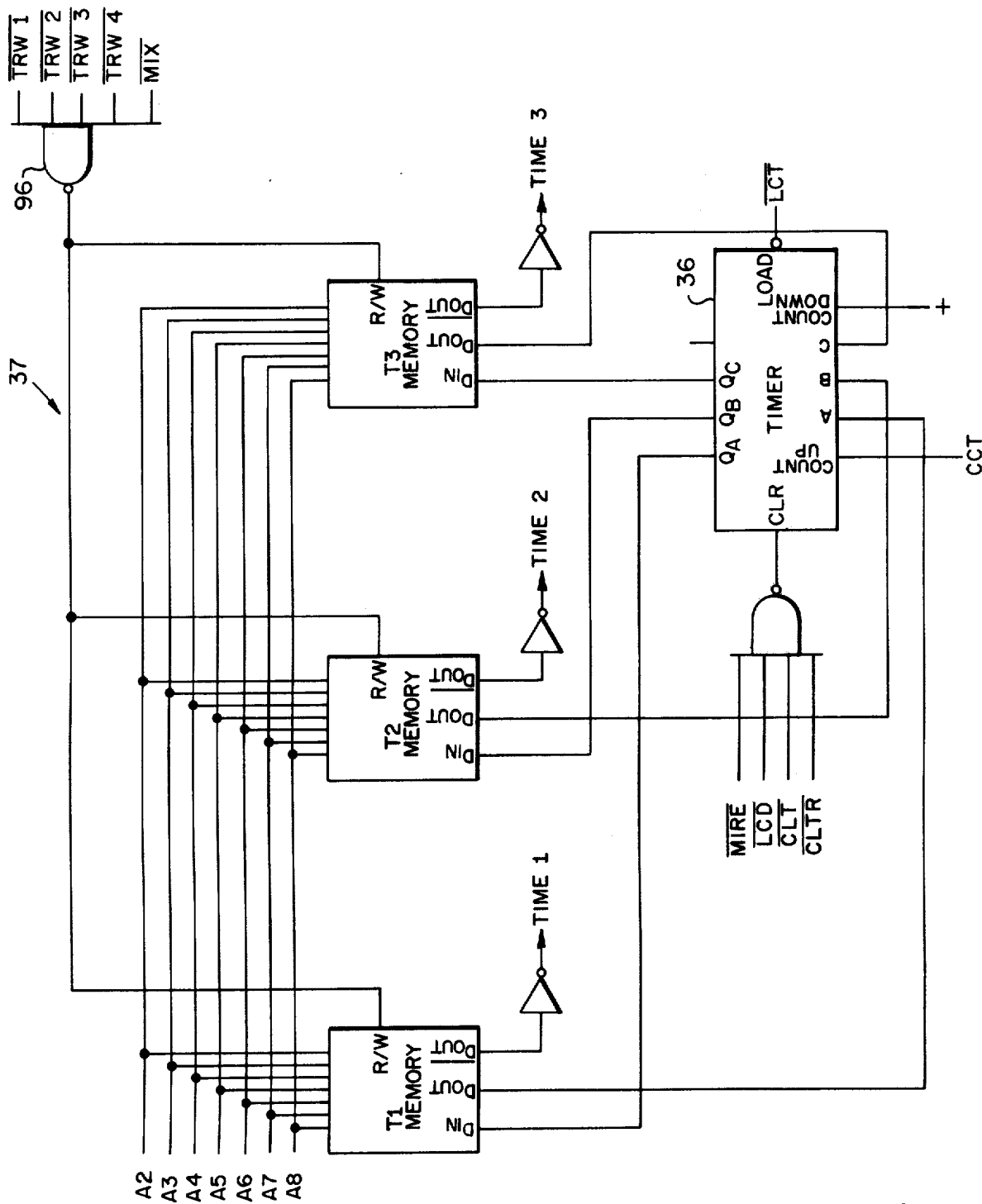
FIG. 8 is a logic diagram of a timer and timer memory.

The timer 36 as illustrated in FIG. 8 is a counter having various input connections from the subroutines section 45. The timer memory 37 includes three random access memory units T1–T3 for storing up to 3 bits of time information for each subscriber line. 88 storage locations of each memory unit are addressed by the address signals A2–A8. The outputs of the timer 36 are applied to the data inputs of the timer memory 37 and the outputs TIME 1 – TIME 3 of the memory 37 are applied to the inputs of the timer 36. A signal from the subroutines section 45 applied through a NAND gate 96 causes the timer memory 37 to write in data fom the timer 36.

Decision Section

Figure 9:
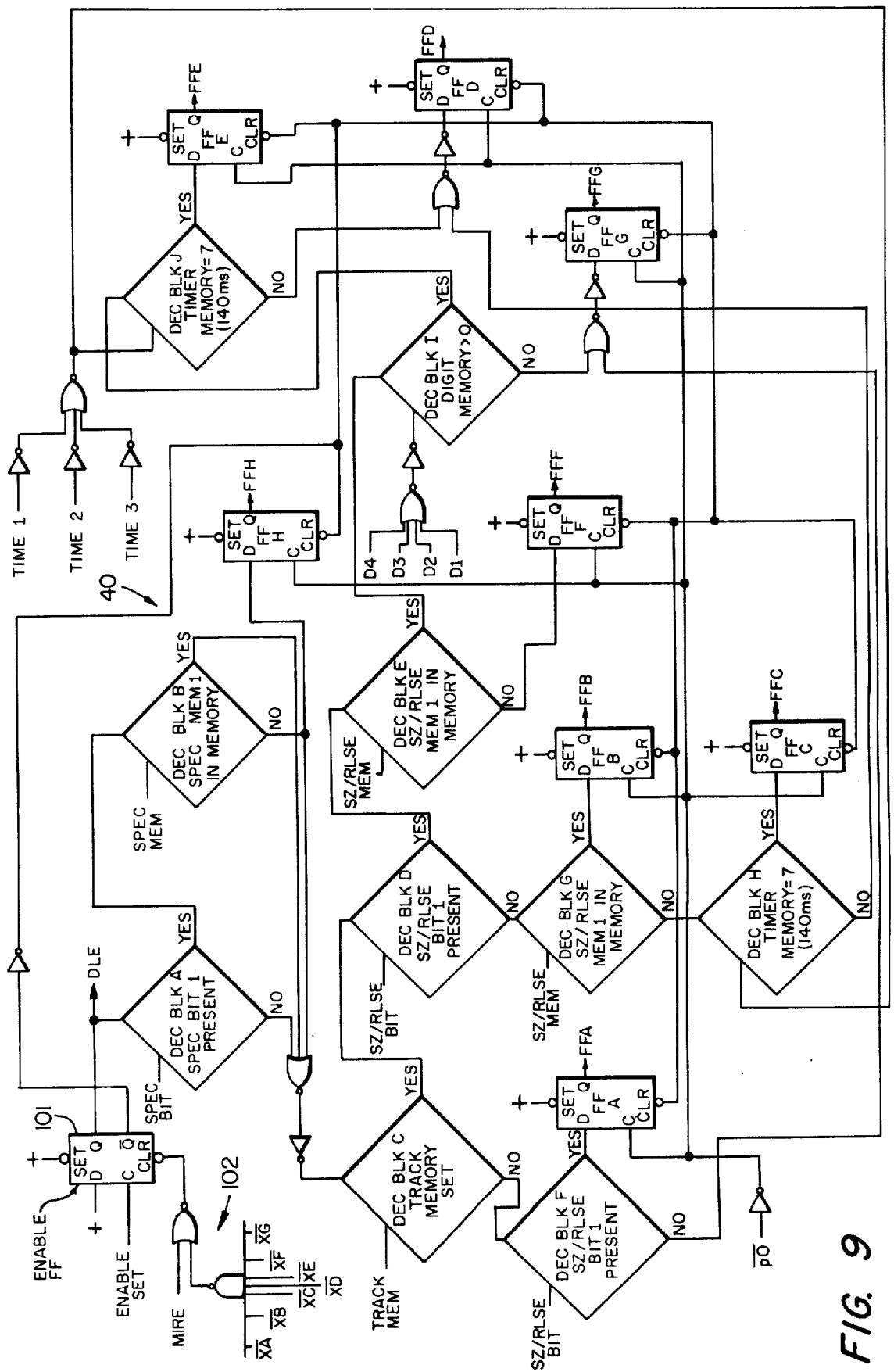
FIG. 9 is a logic diagram of the decision section of the apparatus.
Figures 10A, 10B:
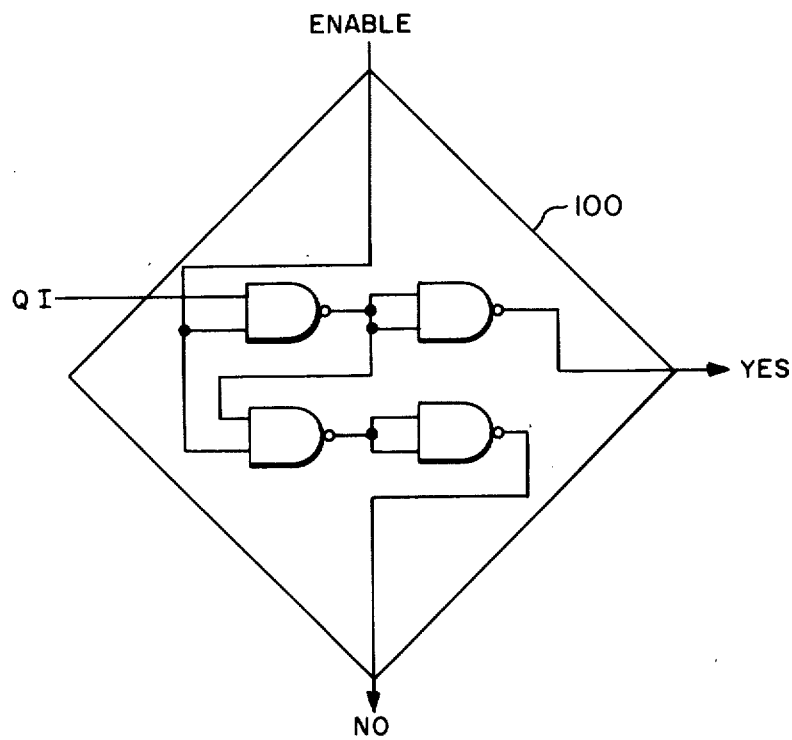
FIG. 10A is a detailed logic diagram of one of the decision blocks employed in the decision section of FIG. 9.
FIG. 10B is a truth table for the decision block of FIG. 10A.

The decision section 40 is shown in detail in FIG. 9. The decision section includes an arrangement of ten decision blocks labeled DEC BLK A through DEC BLK J. Each of the decision blocks is the same and is an arrangement of four NAND gates as illustrated in FIG. 10A. The decision block 100 as illustrated in FIG. 10A has two inputs labeled ENABLE and QI and two outputs labeled YES and No. FIG. 10B is a truth table (using positive logic) for the decison block 100. As can be seen from FIGS. 10A and 10B when a 0 is present at the ENABLE input of decision block 100 both outputs YES and NO are 0 regardless of the QI input. When a 1 is present at the ENABLE input, the decision block produces a 1 at the YES output when a 1 is present at the QI input, and produces a 1 at the NO output when the QI input is 0.

The decision block DEC BLK A – DEC BLK J are connected together and to the SZ/RLSE multiplexer 23, the SPECIAL multiplexer 27, the track memory 31, the SZ/RLSE memory 32, the SPECIAL memory 33, the digit memory 35, and the timer memory 37 as shown in FIG. 9. The decision section 40 also includes eight end-state flip-flops FFA through FFH which are connected to the arrangement of decision blocks. An enable flip-flop 101, when set, enables the arrangement of decision blocks to analyze the information applied thereto and set one or more of the end-state flip-flops FFA-FFH depending upon the particular combination of information received.

The enable flip-flop 101 is set by each ENABLE SET pulse which is produced at the count of 255 by the basic timer 51. When set, the enable flip-flop 101 produces a singla DLE which clears the clock pulse generator 90 of FIG. 5. The counter of the clock pulse generator counts at the 1.152 MHz rate and at the count of 2 produces a $\overline{p0}$ clock pulse. The $\overline{p0}$ clock pulse triggers any of the end-state flip-flops FFA-FFH receiving a signal at its data input from a decision block to the set condition producing a respective output signal labeled FFA-FFH. When the enable flip-flop 101 is reset at the conclusion of a subroutines procedure by a pulse from the subroutines section at a NAND gate 102, it causes the end-state flip-flops FFA-FFH to be cleared.

The manner in which the decision section 40 operates to analyze various combinations of input information will be explained in detail in a subsequent section of the application.

Subroutines Section and Outputs

Figure 11:
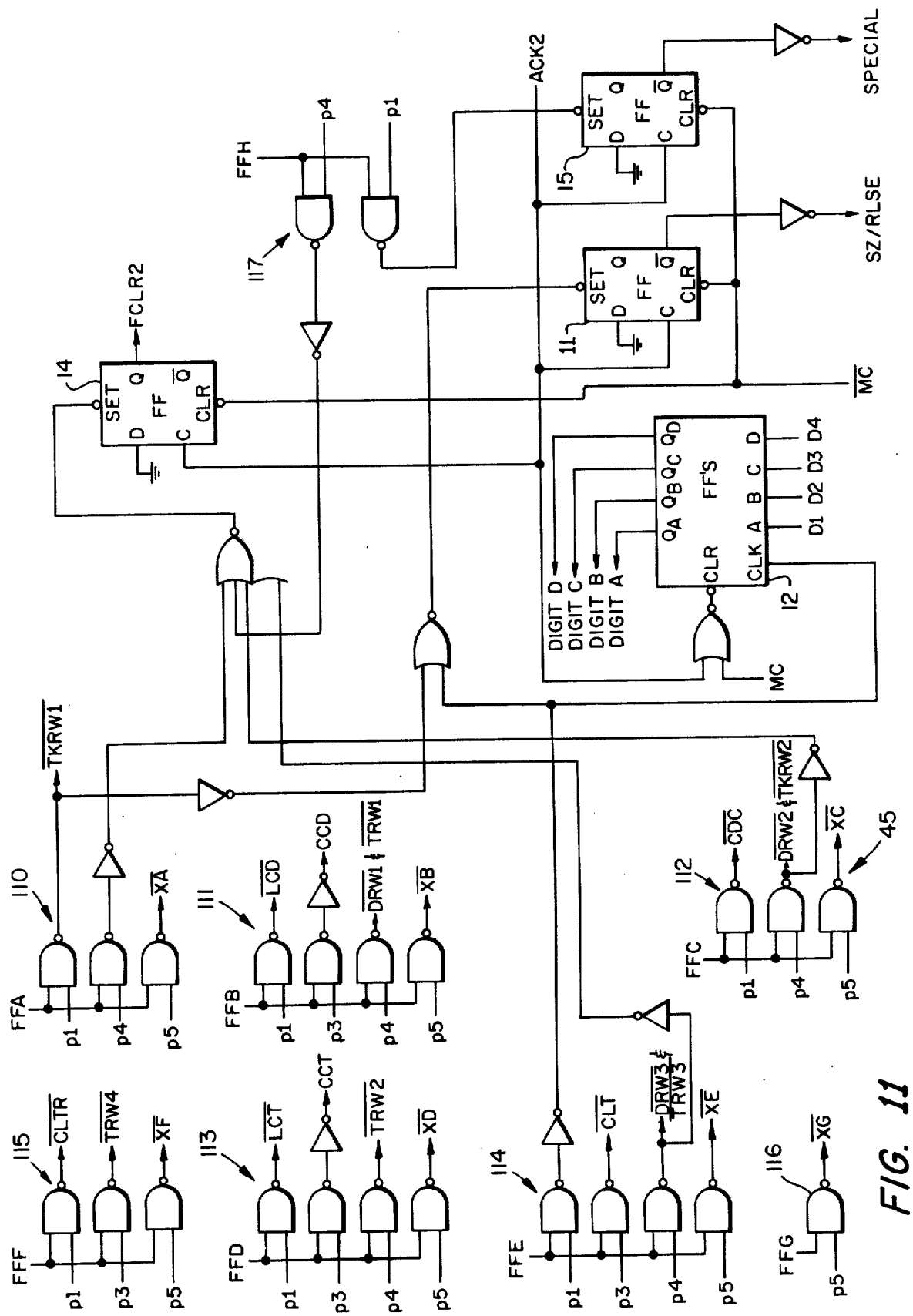
FIG. 11 is a logic diagram of the subroutines section and output buffers of the apparatus.

FIG. 11 illustrates the subroutines section 45 of the apparatus. Portions of the section labeled 110 through 117 are each an arrangement of NAND gates connected to the Q output of a different one of the end-state flip-flops FFA-FFH of the decision section 40. Various combinations of clock pulses p1 and p5 are the other inputs to the arrangements of NAND gates. Thus, when an end-state flip-flop FFA-FFH of the decision section 40 is set on the $\overline{p0}$ clock pulse, clock pulses p1 through p5 cause the associated arrangement of NAND gates to produce a series of output pulses as shown in FIG. 11. These outputs are variously connected to the memories, digit counter, timer and output buffers to cause certain desired actions to take place as will be explained in detail hereinbelow.

Also shown in FIG. 11 is the digit output buffer 12 which includes four D-type flip-flops having inputs connected to the D1-D4 outputs, respectively, of the digit memory 35. The SZ/RLSE output buffer 11, the SPECIAL output buffer 15, and the data ready flip-flop 14 are also D-type flip-flops as shown in FIG. 11. All of these flip-flops are reset by an ACK2 signal received from externally of the scanning apparatus.

Figure 12:
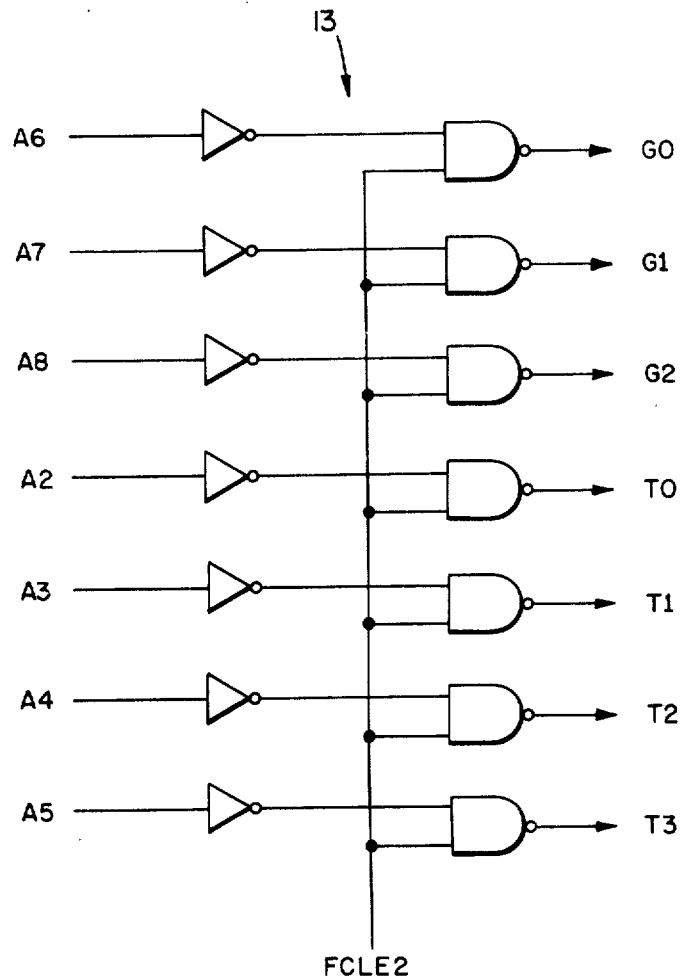
FIG. 12 is a logic diagram of the line data buffer.

The line data buffer 13 is illustrated in FIG. 12. The buffer 13 is an arrangement of inverters and NAND gates having inputs connected to the address information outputs A2-A8 of the terminal and group counters 76 and 80. The NAND gates are gated by a signal FCLE2 which originates externally of the scanning apparatus.

Operation

Before scanning the SZ/RLSE and SPECIAL lines the apparatus undergoes an initialization routine to insure that the memories and counters are clear and that all components are in their proper operating states. A master reset pulse MC and its invert $\overline{MC}$ are applied to various components of the apparatus including the initialization flip-flop 70 shown in FIG. 3. Initialization flip-flop 70 is set and produces the MIRE and $\overline{MIRE}$ signals to various components. On each FCL pulse, on the count of 243 by the basic timer 51, a $\overline{MIX}$ pulse is produced by NAND gate 72 to clear the storage location in each memory associated with the subscriber line identified by the address bits A2-A8. After all storage locations have been cleared, the count of 88 by the address signals A2-A8 is decoded by a decoding arrangement 71 to reset the initialization flip-flop 70.

As explained previously the basic timer 51 of FIG. 3 counts repeatedly through a cycle of 256 1.152 MHz pulses. Thus a cycle of the basic timer 51 is 222.2 microseconds the same as the time slot for each SZ/RLSE BIT and SPEC BIT at the outputs of the SZ/RLSE multiplexer 23 and SPECIAL multiplexers 27, respectively. At the count of 243 an FCL pulse is produced and applied to the NAND gate 61. If an FCLR2 signal is present from the data ready flip-flop 14 indicating that data is available at one of the output buffers 11, 12, or 15 and that an ACK2 signal has not been received, flip-flip 53 is reset. NAND gate 52 is thereby inhibiting preventing the 1.152 MHz pulses from reaching the basic timer 51. The basic timer holds at the count of 243 stopping all action by the apparatus. This situation continues until an ACK2 signal is received at the NOR gate 63 setting the flip-flop 53 and permitting counting of the 1.152 MHz pulses to resume. The ACK2 signal is sent by other equipment in the system after data has been accepted from the output buffers of the apparatus. If the FCLR2 signal is not present during the FCL pulse, the basic timer 51 continues to count without interruption.

On the count of 247 a TERM INC pulse is produced by the basic timer 51. This pulse is applied to the flip-flop 75 associated with the terminal counter 76. If the flip-flop 75 has been set by the A6-A8 signals being all 1's, the TERM INC pulse clears the flip-flop 75 causing the terminal counter 76 to add a count and thus step the output from the decoder 77 of one of terminals S1-S11 to the next terminal in order. All of the input multiplexers 20 and 21 thus step from one input line to the next in their respective groups. This action takes place only when signal A6-A8 are 1's on every eighth TERM INC pulse; that is, every 1.78 milliseconds.

An IBC pulse is produced by the basic timer 51 on the count of 251. This pulse is applied to flip-flop 85 which operates similarly to flip-flop 75 to produce an output pulse on every eighth cycle of the basic timer 51. The output of flip-flop 85 is applied to the SZ/RLSE input buffer 22 and the SPECIAL input buffer 26 causing them to load a new set of eight bits present on lines SZ/RLSE 1 – SZ/RLSE 8 and SPECIAL 1 – SPECIAL 8 from the two sets of eight input multiplexers 20 and 21, respectively.

On a count of 255 of the basic timer 51 the ENABLE SET signal is produced. This signal is applied directly to the group counter 80 causing it to increment by 1. The SZ/RLSE multiplexer 23 and the SPECIAL multiplexer 27 thus step to the next inputs in order. This stepping occurs on every cycle of 256 pulses of the basic timer 51; that is, once every 222.2 microseconds.

Each ENABLE set pulse also sets the enable flip-flop 101 of the decision section 40 shown in FIG. 9. The Q outut DLE of the enable flip-flop 101 enables decision block A and by virtue of the various connections between decision block A, decision block B, and decision block C the DLE signal also enables decision block C. The DLE signal also clears the counter 91 of the clock pulse generator 90 of FIG. 5.

Figure 13:
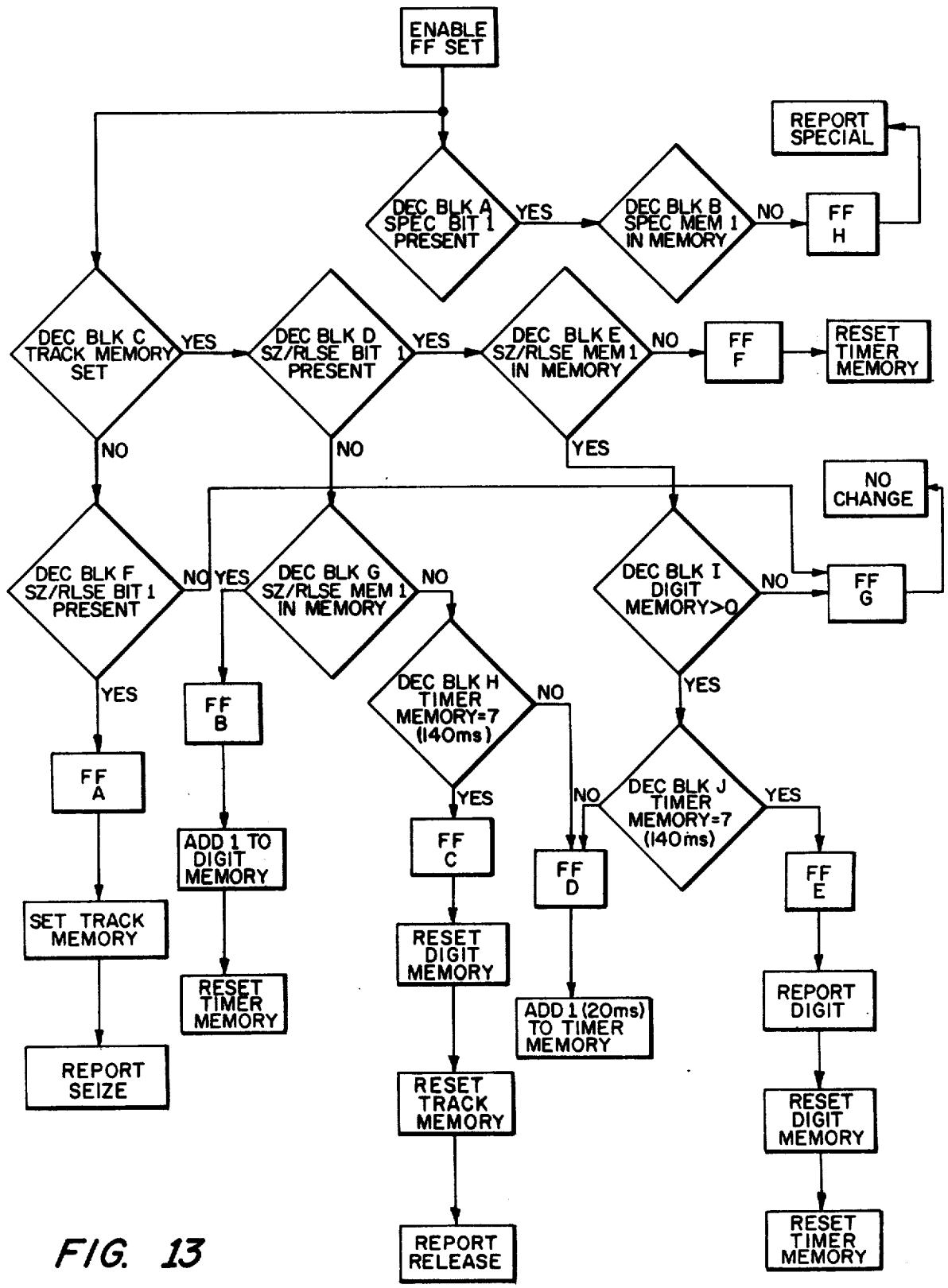
FIG. 13 is a flow chart useful in explaining the operations of the decision and subroutines section of the apparatus.

As explained previously, the decision section 40 of FIG. 9 receives information from various portions of the apparatus and in accordance with the information causes one or more of the end-state flip-flops FFA-FFH to be set on the $\overline{p0}$ pulse from the clock pulse generator 90. The subsequent clock pulses p1 through p5 cause the subroutines section 45 to initiate certain appropriate actions by elements of the apparatus. The operations of the decision section 40 and subroutines section 45 are illustrated by the flow chart of FIG. 13.

Figure 14:
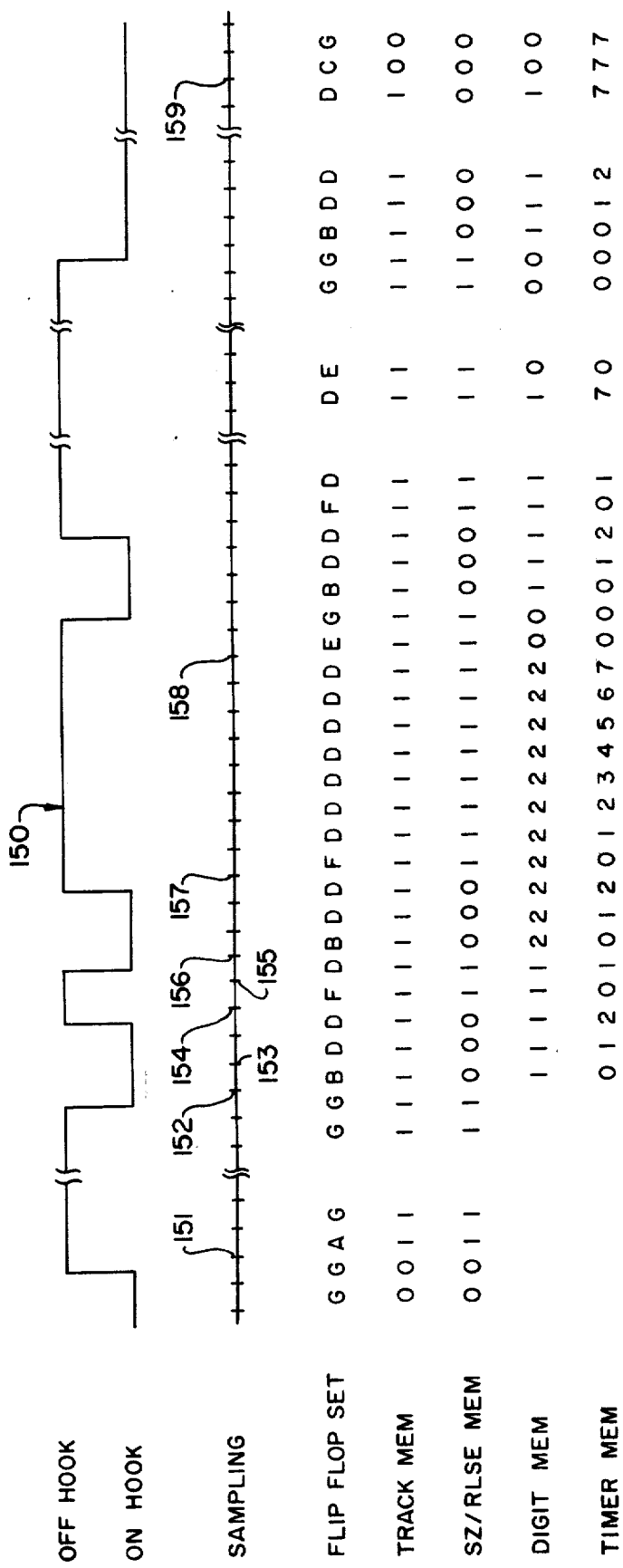
FIG. 14 is a diagram illustrating an exemplary incoming signal and indicating the resulting conditions produced in various portions of the apparatus.

FIG. 14 illustrates an example of an incoming signal 150 on one of the SZ/RLSE input lines. FIG. 14 also indicates the endstate flip-flop FFA-FFH which is set by the arrangement of decision blocks after each sample is taken and the information stored in the track memory, SZ/RLSE memory, digit memory, and timer memory with respect to the SZ/RLSE line carrying the incoming signal. The incoming signal 150 varies between an ON HOOK condition of logic 0 and an OFF HOOK condition of logic 1. Dial pulses occur as a logic 0 or ON HOOK level. The apparatus responds to an ON HOOK (logic 0) level occurring for less than seven sample periods (approximately 140 milliseconds) as a dial pulse. If the ON HOOK level lasts longer than seven sample periods, it is considered a release, or termination of the call. An OFF HOOK (logic 1) level lasting less than seven sample periods is considered to be a pause between dial pulses of the same digit. If the OFF HOOK level persists for longer than seven sample periods, it is considered that all the pulses of a single dialed digit have been received.

As explained previously, the signal is sampled once every 19.6 milliseconds and each sample is present as an SZ/RLSE BIT from the SZ/RLSE multiplexer 23 for a sampling period of 222.2 microseconds. During the sampling period the address information A2–A8 identifies the SZ/RLSE line associated with the SZ/RLSE BIT present and also addresses the proper storage locations associated with that line in each memory.

The following is a detailed description of the operation of the decision section 40 (FIG. 9) and subroutines section (FIG. 11) in response to the illustrative incoming signal 150. All possible operations of the decision section and subroutines section are summarized in the flow chart of FIG. 13.

On the first sample 151 of the illustrative signal 150 taken after the subscriber line goes from the ON Hook to the OFF HOOK condition, decision block C produces a NO signal since the track memory 31 contains a 0, or is not set. This signal is applied to decision block F and since the SZ/RLSE BIT is a 1 by virtue of the OFF HOOK condition, decision block F produces a YES signal. The YES signal is applied to end-state flip-flop FFA. Thus, on the following $\overline{p0}$ clock pulse, end-state flip-flop FFA is triggered to the set condition.

The FFA signal from the end-state flip-flop FFA is applied to the gating arrangement 110 of the subroutines section 45 shown in FIG. 11 and also to the input of the track memory 31 shown in FIG. 6. On the p1 clock pulse the SZ/RLSE MEMORY 32 is caused to write in the present SZ/RLSE BIT which is a 1. This action by the SZ/RLSE memory occurs on every p1 clock pulse, since this pulse is applied directly to the memory and not through any of the gating arrangements of the subroutines section. Also on the p1 clock pulse the gating arrangement 110 produces a $\overline{TKRW1}$ signal to the track memory 31 causing the track memory to write a 1, or be set, since the FFA signal is also being applied to the track memory. In addition, the p1 clock pulse causes the SZ/RLSE output buffer flip-flop 11 to be set producing a SZ/RLSE signal of 1.

On the p4 clock pulse the gating arrangement 110 produces a signal causing the data ready flip-flop 14 to be set thus producing the FCLR2 signal. The FCLR2 signal indicates to other equipment in the system that data is available. The p5 clock pulse resets enable flip-flop 101. The enable flip-flop 101 then resets the end-state flip-flop FFA.

After the FCLR2 signal from the data ready flip-flop 14 is transmitted, the output buffers may be sampled to receive the available information. In this instance, the data is the indication that a seize or OFF HOOK condition has been established as indicated by a SZ/RLSE signal of 1. The equipment sampling the output buffers also applies an FCLE2 pulse to the line data buffer 13 which provides appropriate signals G0–G2 and T0–T3 identifying the group and terminal of the SZ/RLSE line associated with the output data available. Once the data is taken, an ACK2 pulse is applied to the scanning apparatus. This pulse resets the output buffers containing data, specifically the data ready flip-flop 14 and the SZ/RLSE output buffer 11.

If the ACK2 pulse is not received before the basic timer 51 reaches a count of 243, the combination of the FCL pulse from the data ready flip-flop 14 resets flip-flop 53 (FIG. 3) causing the basic timer 51 to stop counting. Operation of the apparatus stops and no further sampling or processing is performed until an ACK2 pulse resets the output buffers and also sets flip-flop 53 permitting the basic timer 51 to resume counting.

The next change in the samples received takes place on sample 152 after a transition on the leading edge of a dial pulse. When the enable flip-flop 101 is set, decision block C is enabled and since the track memory 31 is set with a 1 stored therein decision block C produces a YES signal to decision block D. Since the SZ/RLSE Bit is 0, decision block D produces a NO signal to decision block G. The SZ/RLSE MEM signal from the SZ/RLSE memory 32 is a 1 since the previous most recent bit which is stored therein is a 1. Thus, decision block G produces a YES signal and on the $\overline{p0}$ clock pulse end-state flip-flop FFB is triggered to the set condition.

On the p1 clock pulse a 0 is loaded in the SZ/RLSE memory 32 and the gating arrangement 111 produces an LCD signal to both the digit counter 34 and the timer 36. The digit counter 34 is caused to load the contents of the digit memory 35 which is 0. The timer 36 is cleared to 0. On the p3 clock pulse the gating arrangement 111 produces a CCD signal which adds a count to the digit counter 34 to produce an accumulated count of 1. On the p4 clock pulse the gating arrangement 111 produces a $\overline{DRW1}$ and a $\overline{TRW1}$ signal. These signals are applied to the digit memory 35 the timer memory 37 causing the digit memory to write in the count of 1 from the digit counter 34 and causing the timer memory 37 to write in the 0 from the timer 36. On the p5 clock pulse the enable flip-flop 101 is reset causing end-state flip-flop FFB to be reset also.

On the next sample 153 of the incoming signal the decision block C produces a YES signal to the decision block D. Since the incoming signal is still 0, decision block D produces a NO signal to decision block G. Since a 0 is stored in the SZ/RLSE memory 32, decision block G produces a NO signal to decision block H. The contents of the timer memory 37 is 0 and, therefore, decision block H produces a NO signal causing end-state flip-flop FED to be set on the $\overline{p0}$ clock pulse. On the p1 clock pulse a 0 is stored in the SZ/RLSE memory 32 and the gating arrangement 113 produces an $\overline{LCT}$ pulse. The $\overline{LCT}$ signal is applied to the timer 36 and causes the timer 36 to load the contents of the timer memory 37 (0) into the timer. On the p3 clock pulse the gating arrangement 113 produces a CCT signal which is applied to the timer 36 causing it to add a count to produce an accumulated count of 1. On the p4 clock pule the gating arrangement 113 produces a $\overline{TRW2}$ pulse which causes the timer memory 37 to write the contents of the timer 36 (a count of 1) into the timer memory 37. On the p5 clock pulse the enable flip-flop 101 and consequently the end-state flip-flop FFD are reset.

On the next sample end-state flip-flop FFD is set again and the subroutines section causes a count of 1 to be added to the contents of the timer memory for a total count of 2. On the next sample 154 after a transition on the trailing edge of the dial pulse, decision block C produces a YES and decision block D also produces a YES signal. Since the SZ/RLSE MEM bit in the SZ/RLSE memory 32 is 0, decision block E produces a NO signal thus setting the end-state flip-flop FFF on the $\overline{p0}$ clock pulse. On the p1 clock pulse the SZ/RLSE memory 32 stores a 1 and the gating arrangement 115 produces a $\overline{CLTR}$ signal to clear the timer 36 to 0. On the p3 clock pulse the gating arrangement 115 produces a $\overline{TRW4}$ pulse causing the 0 in the timer 36 to be written into the timer memory 37. On the p5 clock pulse the gating arrangement 115 causes the enable flip-flop 101 and subsequently the end-state flip-flop FFF to be reset.

On the next sample 155 decision block C produces a YES signal and decision block D also produces a YES signal. Since the SZ/RLSE MEM bit is 1, decision block E produces a YES signal to decision block I. The digit memory 35 contains a count of 1 and, therefore, decision block I produces a YES to decision block J. The contents of the timer memory 37 is not equal to 7 and, therefore, decision block J produces a NO signal causing end-state flip-flop FFD to be set on the $\overline{p0}$ pulse. End-state flip-flop FFD causes the gating arrangement 113 to perform the subroutine described previously adding a count of 1 to the timer memory 37 for a total count of 1.

The next sample 156 takes place after a transition starting the second pulse of the dial pulse digit. The decision block C produces a YES signal and decision block D produces a NO signal. Decision block G produces a YES signal causing end-state flip-flop FFB to be set on the $\overline{p0}$ clock pulse. The gating arrangement 111 then causes the appropriate subroutine to be performed which adds a count of 1 to the digit memory 35 for an accumulated count of 2 and also resets the timer memory 37 to 0.

On the next two samples the end-state flip-flop FFD is set causing the digit memory 35 to retain the count of 2 and causing the timer memory 37 to accumulate a count of 2.

The sample 157 is taken after a transition at the trailing edge of the second dial pulse of the digit. A YES signal is produced by decision block C and by decision block D. Decision block E produces a NO signal causing end-state flip-flop FFF to be set on the $\overline{p0}$ clock pulse. Thus, the gating arrangement 115 is activated causing the timer memory 37 to be cleared to 0.

On each of the seven following samples during which the OFF HOOK high level signal remains, end-state flip-flop FFD is set causing the count in the timer memory 37 to accumulate to a count of 7. The count of 7 (approximately 140 milliseconds) is chosen as a lapse of time sufficient to indicate that all the dial pulses of a single digit have been received.

On the next sample 158 decision block C produces a YES signal, decision block D also produces a YES signal, and decision block E produces a YES signal. Since there is a count present in the digit memory 35, decision block I produces a YES to decision block J. Since the timer memory 37 contains a count of 7, decision block J produces a YES signal causing end-state flip-flop FFE to be set on the $\overline{p0}$ clock pulse. Gating arrangement 114 is thus activated.

On the p1 clock pulse the SZ/RLSE BIT of 1 is stored in the SZ/RLSE memory 32 and the flip-flops of the digit output buffer 12 are clocked to receive signals D1-D4 representing a count of 2 from the digit memory 37. Also the p1 clock pulse sets the SZ/RLSE output buffer 11 to produce a SZ/RLSE signal of 1. On the p3 clock pulse the gating arrangement 114 produces a $\overline{CLT}$ signal which resets both the digit counter 34 and the timer 36 to 0. On the p4 clock pulse the gating arrangement 114 produces a $\overline{DRW3}$ and a $\overline{TRW3}$ pulse. These signals cause the digit memory 35 and the timer memory 37 to write in the 0 from the digit counter 34 and timer 36, respectively. Also on the p4 clock pulse the data ready flip-flop 14 is set to produce the FCLR2 signal. On the p5 clock pulse the enable flip-flop 101 and consequently the endstate flip-flop FFE are reset.

The FCLR2 signal indicates that data is available to be read out of the apparatus. The DIGIT A – DIGIT D signals represent a digit of 2 and the SZ/RLSE signal indicates that the line is still in a seized condition. The line data buffer 20 is interrogated by the FCLE2 signal to produce the G0–G2 and T0–T3 signals identifying the particular SZ/RLSE line to which the digit and SZ/RLSE data pertain. After the data has been read out, an ACK2 signal is received by the apparatus resetting the output buffers 11, 12, and 14 and also, if necessary, flip-flop 53 (FIG. 3).

Another condition which must be determined by the scanning apparatus is the completion of the call or release when the line returns to the ON HOOK condition. It is considered that this situation has occurred when the incoming signal 150 remains at the 0 level for a period of seven samples; that is, approximately 140 milliseconds. The detection of this situation occurs at sample 159, the sample which occurs after the timer memory 37 has accumulated a count of 7. At sample 159 decision block C produces a YES signal and decision block D produces a NO signal. Decision block G produces a NO signal. Since the timer memory 37 contains a count of 7, decision block H produces a YES signal causing end-state flip-flop FFC to be set on the $\overline{p0}$ clock pulse.

On the p1 clock pulse the SZ/RLSE memory 32 writes in a SZ/RLSE BIT of 0, and the gating arrangement 112 produces a $\overline{CDC}$ pulse. This signal is applied to the digit counter 34 and clears the digit counter to 0. On the p4 clock pulse the gating arrangement 112 produces a $\overline{DRW2}$ and $\overline{TKRW2}$ signal. The $\overline{DRW2}$ pulse causes the digit memory 35 to write in the 0 from the digit counter 34. The $\overline{TKRW2}$ signal causes the track memory 31 to write in a 0 since the FFA signal is 0, thus resetting the track memory. The data ready flip-flop 14 is also set on the p4 clock pulse producing the FCLR2 signal. On the p5 clock pulse the enable flip-flop 101 and subsequently the end-state flip-flop FFC are reset. The FCLR2 signal indicates that data is ready to be taken, in this instance the SZ/RLSE signal of 0 indicating the release condition. The ACK2 signal again resets the data ready flip-flop 14 and permits the apparatus to continue scanning.

The foregoing illustrates the operation of the decision section 40 and subroutines section 45 in responding to samples indicating an action must be performed. Under certain conditions no action is necessary. When the ON HOOk level is detected subsequent to a release condition being reported, decision block C produces a NO signal and decision block F also produces a NO signal causing end-state flip-flop FFG to be set. End-state flip-flop FFG is also set when decision blocks C, D, and E produce YES signals and decision block I produces a NO signal. This situation occurs during a call while no dial pulse information is being received. On the p1 clock pulse the SZ/RLSE BIT, which is the same as the last SZ/RLSE BIT, is written into the SZ/RLSE memory 32. End-state flip-flop FFG activates NAND gate 116 and on the p5 clock pulse the enable flip-flop 101 and consequently the end-state flip-flop FFG are reset. The apparatus operates during each sampling period of each SZ/RLSE input line to set one of the end-state flip-flops FFA through FFG and execute a subroutine as explained. At the same time a parallel operation is performed with respect to the SPECIAL input lines.

When the enable flip-flop 101 is set decision block A is enabled. If the SPEC BIT is 0, decision block a, in effect, does nothing. If the SPEC BIT is 1, decision block A produces a YES signal to decision block B. If the SPECIAL memory 33 contains a SPEC MEM of 0, then decision block B produces a NO signal causing end-state flip-flop FFH to be set on the $\overline{p0}$ clock pulse.

On the p1 clock pulse the SPEC BIT is written into the SPECIAL memory 33. This action takes place on every p1 clock pulse regardless of the condition of end-state flip-flop FFH. When end-state flip-flop FFH is set gating arrangement 117 is activated. Thus on the p1 clock pulse the SPECIAL output buffer 15 is set to produce a SPEC signal of 1. On the p4 clock pulse the data ready flip-flop 14 is set to produce the FCLR2 signal indicating that data is available. After the data has been taken an ACK2 signal resets the output buffers 14 and 15 and permits the basic timer 51 to continue counting.

Thus, as explained in detail hereinabove the scanning apparatus as disclosed operates to scan continuously 88 subscriber lines to detect and report seizure or release of the lines. In addition, the apparatus detects dial pulse digits at any time between seizure and release of a line. The apparatus detects transitions between levels of an incoming signal and by recognizing the direction of the transition and their time relationships determines when seizure and release have occurred and also counts and reports the number of pulses of each dialed digit.

Scanning apparatus in accordance with the invention as described reports to other equipment of the system only when there is new information to be reported. The apparatus does not require a pool of register-senders to detect and process the dial pulse signals. In addition, the need for a special bylink matrix or an arrangement for storing the first dial pulse information is eliminated.

While there has been shown and described what is considered a preferred embodiment of the present invention, it will be obvious to those skilled in the art that various changes and modifications may be made therein without departing from the invention as defined by the appended claims.

What is clamed is:

1. Apparatus for receiving and counting pulses comprising
   means for receiving an incoming signal with portions of a first level and with pulses of a second level;
   sampling means for periodically sampling an incoming signal and determining whether each sample is at the first or the second level;
   sample memory means for storing the most recent sample;
   digit counting means for recording a count in response to the presence of a sample at the second level when the most recent sample stored in the sample memory means is at the first level;
   timing means for accumulating a count of samples at the first level;
   means for clearing the timing means of the accumulated count therein in response to the presence of a sample at the first level when the most recent sample stored in the sample memory means is at the second level;
   readout means for reading out the accumulated count in the digit counting means when a predetermined accumulated count is present in the timing means; and
   means for clearing the digit counting means of the accumulated count therein subsequent to reading out of the accumulated count by the readout means;
   whereby the readout means produces a count of the number of pulses at the second level occurring prior to a period at the first level sufficiently long for the timing means to accumulate a count equal to said predetermined count.

2. Apparatus in accordance with claim 1 including track means operable to be activated in response to the presence of a sample at the first level when the most recent sample stored in the sample memory means is at the second level;

said digit counting means being enabled to record counts when said track means is activated;

said timing means being enabled to accumulate a count of samples at the first and second levels when said track means is activated;

means for clearing the timing means of the accumulated count therein in resonse to the presence of a sample at the second level when the most recent sample stored in the sample memory means is at the first level;

reset means for clearing the digit counting means of the accumulated count therein and for inactivating the track means in response to a predetermined accumulated count in the timing means and the presence of a sample at the second level; and said readout means being operable to read out the accumulated count in the digit counting means in response to said predetermined accumlated count in the timing means and the presence of a sample at the first level.

3. Apparatus for receiving and counting pulses comprising means for receiving an incoming signal with portions of a first level and with pulses of a second level;

sampling means for periodically sampling an incoming signal and determining whether each sample is at the first or the second level;

sample memory means for storing the most recent sample;

digit counting means for accumulating a count of pulses;

timing means for accumulating a count of samples;

readout means for reading out the accumulated count in the digit counting means; and signal processing means coupled to said sampling means, said sample memory means, said digit counting means, said timing means, and said readout means;

said signal processing means including first logic means operable to cause said digit counting means to record a count in response to the presence of a sample at the second level when the most recent sample stored in the sample memory means is at the first level, second logic means operable to clear the timing means of the accumulated count therein in response to the presence of a sample at the first level when the most recent sample stored in the sample memory means is at the second level, third logic means operable to cause said timing means to record a count in response to the presence of a sample at the first level when the most recent sample stored in the sample memory means is at the first level, and fourth logic means operable to cause said readout means to read out the accumulated count in the digit counting means and subsequently to clear the digit counting means of the count therein when a predetermined accumulated count is present in the timing means;

whereby the readout means produces a count of the number of pulses at the second level occurring prior to a period at the first level sufficiently long for the timing means to accumulate a count equal to said predetermined count.

4. Apparatus in accordance with claim 3 including track means having an active condition and an inactive condition;

said track means enabling said first, second, third, and fourth logic means to be operable when in the active condition and preventing said first, second, third, and fourth logic means from being operable when in the inactive condition;

said signal processing means including fifth logic means operable to activate said track means in response to the presence of a sample at the first level when the most recent sample stored in the sample memory means is at the second level, said first logic means being operable to clear the timing means of the accumulated count therein in response to the presence of a sample at the second level when the most recent sample stored in the sample memory means is at the first level, sixth logic means operable to cause said timing means to record a count in response to the presence of a sample at the second level when the most recent sample stored in the sample memory means is at the second level and the track means is in the active condition, and seventh logic means operable to clear the digit counting means of the accumulated count therein and to inactivate the track means when a predetermined accumulated count is present in the timing means.

5. Apparatus in accordance with claim 4 wherein said first logic means includes first logic flip-flop means operable when in a set condition to cause said digit counting means to record a count and to clear said timing means of the accumulated count therein, and means coupled to said track means, said sampling means, said sample memory means, and said first logic flip-flop means and operable to place said first logic flip-flop means in the set condition in response to the presence of a sample at the second level when the most recent sample stored in the sample memory means is at the first level and the track means is in the active condition;

said second logic means includes second logic flip-flop means operable when in a set condition to clear said timing means of the accumulated count therein, and means coupled to said track means, said sampling means, said sample memory means, and said second logic flip-flop means, and operable to place said second logic flip-flop means in the set condition in response to the presence of a sample at the first level when the most recent sample stored in the sample memory means is at the second level and the track means is in the active condition;

said third logic means includes third logic flip-flop means operable when in a set condition to cause said timing means to record a count, and means coupled to said track means, said sampling means, said sample memory means, said digit counting means, said timing means, and said third logic flip-flop means and operable to place said third logic flip-flop means in the set condition in response to the presence of a sample at the first level when the most recent sample stored in the sample memory means is at the first level, a count is present in the digit counting means, the accumulated count in the timing means is less than said predetermined accumulated count, and the track means is in the active condition;

said fourth logic means includes
  fourth logic flip-flop means operable when in a set condition to cause said readout means to read out the accumulated count in the digit counting means and subsequently to clear the digit counting means of the accumulated count therein, and
  means coupled to said track means, said sampling means, said sample memory means, said digit counting means, said timing means, and said fourth logic flip-flop means and operable to place said fourth logic flip-flop means in the set condition in response to the presence of a sample at the first level when the most recent sample stored in the sample memory means is at the first level, a count is present in the digit counting means, said predetermined accumulated count is present in the timing means, and the track means is in the active condition;

said fifth logic means includes
  fifth logic flip-flop means operable when in a set condition to activate said track means, and
  means coupled to said track means, said sampling means, and said fifth logic flip-flop means and operable to place said fifth logic flip-flop means in the set condition in response to the presence of a sample at the first level when the track means is in the inactive condition;

said sixth logic means includes
  said third logic flip-flop means, and
  means coupled to said track means, said sampling means, said sample memory means, said timing means, and said third logic flip-flop means and operable to place the third logic flip-flop means in the set condition in response to the presence of a sample at the second level, when the most recent sample stored in the sample memory means is at the second level, the count in the timing means is less than said predetermined count, and the track means is in the active condition;

said seventh logic means includes
  seventh logic flip-flop means operable when in a set condition to clear the digit counting means of the accumulated count therein and to inactivate the track means, and
  means coupled to said track means, said sampling means, said sample memory means, said timing means, and said seventh logic flip-flop means and operable to place said seventh logic flip-flop means in the set condition in response to the presence of a sample at the second level when the most recent sample stored in the sample memory means is at the second level, said predetermined accumulated count is present in the timing means, and the track means is in the active condition.

6. Apparatus in accordance with claim 5 including first decision means coupled to said track means and operable to produce a signal at a first output in response to the track means being in the active condition and to produce a signal at a second output in response to the track means being in the inactive condition;

second decision means coupled to the second output of the first decision means and to the sampling means and operable to produce a signal at a first output when a sample at the first level is present and a signal is present at the second output of the first decision means and to produce a signal at a second output when a sample at the second level is present and a signal is present at the second output of the first decision means;

said fifth logic flip-flop means being connected to the first output of the second decision means and operable to be placed in the set condition when a signal is present at the first output of the second decision means;

third decision means coupled to the first output of the first decision means and to the sampling means and operable to produce a signal at a first output when a sample at the first level is present and a signal is present at the first output of the first decision means and to produce a signal at a second output when a sample at the second level is present and a signal is present at the first output of the first decision means;

fourth decision means coupled to the second output of the third decision means and to the sample memory means and operable to produce a signal at a first output when the most recent sample stored in the sample memory means is at the first level and a signal is present at the second output of the third decision means and to produce a signal at a second output when the most recent sample stored in the sample means is at the second level and a signal is present at the second output of the third decision means;

said first logic flip-flop means being coupled to the first output of the fourth decision means and operable to be placed in the set condition when a signal is present at the first output of the fourth decision means;

fifth decision means coupled to the second output of the fourth decision means and to the timing means and operable to produce a signal at a first output when the accumulated count in the timing means equals said predetermined accumulated count and a signal is present at the second output of the fourth decision means and to produce a signal at a second output when the accumulated count in the timing means is less than said predetermined accumulated count and a signal is present at the second output of the fourth decision means;

said third logic flip-flop means being connected to the second output of the fifth decision means and operable to be placed in the set condition when a signal is present at the second output of the fifth decision means;

said seventh logic flip-flop means being connected to the first output of the fifth decision means and operable to be placed in the set condition when a signal is present at the first output of the fifth decision means;

sixth decision means coupled to the first output of the third decision means and to the sample memory means and operable to produce a signal at a first output when the most recent sample stored in the sample memory means is at the first level and a signal is present at the first output of the third decision means and to produce a signal at a second output when the most recent sample stored in the sample memory means is at the second level and a signal is present at the first output of the third decision means;

said second logic flip-flop means being connected to the second output of the sixth decision means and operable to be placed in the set condition when a signal is present at the second output of the sixth decision means;

seventh decision means coupled to the first output of the sixth decision means and to the digit counting means and operable to produce a signal at a first output when a count is present in the digit counting means and a signal is present at the first output of the sixth decision means and to produce a signal at a second output when a count is not present in the digit counting means and a signal is present at the first output of the sixth decision means;

eighth decision means coupled to the first output of the seventh decision means and to the timing means and operable to produce a signal at a first output when the accumulated count in the timing means is equal to said predetermined accumulated count and a signal is present at the first output of the seventh decision means and to produce a signal at a second output when the accumulated count in the timing means is less than said predetermined accumulated count and a signal is present at the first output of the seventh decision means;

said third logic flip-flop means being connected to the second output of the eighth decision means and operable to be placed in the set condition when a signal is present at the second output of the eighth decision means; and said fourth logic flip-flop means being connected to the first output of the eighth decision means and operable to be placed in the set condition when a signal is present at the first output of the eighth decision means.

7. Apparatus in accordance with claim 6 including enabling flip-flop means coupled to said first decision means and operable when in a set condition to enable said first decision means to produce a signal at one of said outputs;

control means operable to cause said sampling means to produce a sample of the incoming signal during a sampling period;

said control means being operable during each sampling period subsequent to a sample being produced by the sampling means to trigger said enabling flip-flop means to the set condition;

said control means being coupled to each of said logic flip-flop means and operable to trigger a logic flip-flop means connected to the output of a decision means having a signal thereon to the set condition during each sampling period subsequent to the triggering of the enabling flip-flop means to the set condition;

said control means being coupled to said sample memory means and operable during each sampling period subsequent to the triggering of a logic flip-flop means to the set condition to cause the sample memory means to store the sample produced during the sampling period in place of the previous most recent sample;

said first logic means including first logic gating means coupled to said first logic flip-flop means, said control means, said digit counting means, said timing means, and said enabling flip-flop means;

said second logic means including second logic gating means coupled to said second logic flip-flop means, said control means, said timing means, and said enabling flip-flop means;

said third logic means including third logic gating means coupled to said third logic flip-flop means, said control means, said timing means, and said enabling flip-flop means;

said fourth logic means including fourth logic gating means coupled to said fourth logic flip-flop means, said control means, said readout means, said digit counting means, said timing means, and said enablling flip-flop means;

said fifth logic means including fifth logic gating means coupled to said fifth logic flip-flop means, said control means, said track means, and said enabling flip-flop means;

said seventh logic means including seventh logic gating means coupled to said seventh logic flip-flop means, said control means, said digit counting means, said track means, and said enabling flip-flop means;

eighth logic means including
  eight logic flip-flop means coupled to the second output of the second decision means and to the second output of the seventh decision means, and operable to be placed in a set condition when a signal is present at either the second output of the second decision means or the second output of the seventh decision means, and
  eighth logic gating means coupled to said eighth logic flip-flop means, said control means, and said enabling flip-flop means;

said enabling flip-flop means being operable when in a reset condition to reset each of said logic flip-flop means to a reset condition and to prevent said first decision means from producing a signal at either one of said outputs;

said control means being operable to produce a series of timing signals to said logic gating means during each sampling period subsequent to the triggering of a logic flip-flop means to the set condition;

said first logic gating means being operable in response to said timing signals from the control means when the first logic flip-flop means is in the set condition to cause said digit counting means to record a count, to clear said timing means, and subsequently to reset said enabling flip-flop means to the reset condition;

said second logic gating means being operable in response to said timing signals from the control means when the second logic flip-flop means is in the set condition to clear said timing means and subsequently to reset said enabling flip-flop means to the reset condition;

said third logic gating means being operable in response to said timing signals from the control means when the third logic flip-flop means is in the set condition to cause said timing means to record a count and subsequently to reset said enabling flip-flop means to the reset condition;

said fourth logic gating means being operable in response to said timing signals from the control means when the fourth logic flip-flop means is in the set condition to cause said readout means to read out the accumulated count in said digit counting means, subsequently to clear said digit counting means, to clear said timing means, and subsequently to reset said enabling flip-flop means to the reset condition;

said fifth logic gating means being operable in response to said timing signals from the control means when the fifth logic flip-flop means is in the set condition to cause said track means to be activated and subsequently to reset said enabling flip-flop means to the reset condition;

said seventh logic gating means being operable in response to said timing signals from the control means when the seventh logic flip-flop means is in the set condition to clear said digit counting means, to inactivate said track means, and subsequently to reset said enabling flip-flop means to the reset condition; and said eight logic gating means being operable in response to said timing signals from the control means when the eighth logic flip-flop means is in the set condition to reset said enabling flip-flop means to the reset condition.

8. Apparatus for scanning a plurality of input lines having incoming signals with portions of a first level and with pulses of a second level comprising multiplexing means for periodically sampling said input lines in recurring sequence and producing samples of the incoming signals at a corresponding first or second level at an output;

sample memory means for storing the most recent sample associated with each input line;

digit counting means for recording a count associated with an input line in response to the presence at the multiplexing means output of a sample at the second level associated with the same input line when the most recent sample associated with the same input line stored in the sample memory means is at the first level;

timing means for accumulating counts of samples at the first level associated with each input line;

means for clearing the timing means of the accumulated count therein associated with an input line in response to the presence at the multiplexing means output of a sample at the first level associated with the same input line when the most recent sample associated with the same input line stored in the sample memory means is at the second level;

readout means for reading out the accumulated count associated with an input line in the digit counting means when a predetermined accumulated count associated with the same input line is present in the timing means;

line address means for producing line identifying signals designating the particular input line associated with said accumulated count read out of the digit counting means; and means for clearing the digit counting means of the accumulated count therein associated with an input line subsequent to reading out of said accumulated count associated with the same input line by the readout means;

whereby the readout means produces a count of the number of pulses at the second level occurring on an input line prior to a period at the first level sufficiently long for the timing means to accumulate a count equal to said predetermined count.

9. Apparatus in accordance with claim 8 including track means operable to be activated for an associated input line in response to the presence at the multiplexing means output of a sample at the first level associated with the same input line when the most recent sample associated with the same input line stored in the sample memory means is at the second level;

said digit counting means being enabled to record a count associated with an input line while said track means is activated for the same input line;

said timing means being enabled to accumulate a count of samples at the first and second levels associated with an input line while said track means is activated for the same input line;

means for clearing the timing means of the accumulated count therein associated with an input line in response to the presence at the multiplexing means output of a sample at the second level associated with the same input line when the most recent sample associated with the same input line stored in the sample memory means is at the first level;

reset means for clearing the digit counting means of the accumulated count therein associated with an input line and for inactivating the track means for the same input line in response to a predetermined accumulated count associated with the same input line in the timing means and the presence at the multiplexing means output of a sample at the second level associated with the same input line; and said readout means being operable to read out the accumulated count associated with an input line in the digit counting means in response to said predetermined count associated with the same input line in the timing means and the presence at the multiplexinhg means output of a sample at the first level associated with the same input line.

10. Apparatus for scanning a plurality of input lines having incoming signals with portions of a first level and with pulses of a second level comprising multiplexing means for periodically sampling said input lines in recurring sequence and producing samples of the incoming signals at a corresponding first or second level at an output;

sample memory means for storing the most recent sample associated with each input line;

digit counting means for accumulating a count of pulses associated with each input line;

timing means for accumulating a count of samples associated with each input line;

readout means for eading out the accumulated count associated with an input line in the digit counting means;

signal processing means coupled to said multiplexing means, said sample memory means, said digit counting means, said timing means, and said readout means;

said signal processing means including first logic means operable to cause said digit counting means to record a count associated with an input line in response to the presence at the multiplexing means output of a sample at the second level associated with the same input line when the most recent sample associated with the same input line stored in the sample memory means is at the first level, second logic means operable to clear the timing means of the accumulated count therein associated with an input line in response to the presence at the multiplexing means output of a sample at the first level associated with the same input line when the most recent sample associated with the same input line stored in the sample memory means is at the second level, third logic means operable to cause said timing means to record a count associated with an input line in response to the presence at the multiplexing means output of a sample at the first level associated with the same input line when the most recent sample associated with the same input line stored in the sample memory means is at the first level, and fourth logic means operable to cause said readout means to read out the accumulated count associated with an input line in the digit counting means and subsequently to clear the digit counting means of the count when a predetermined accumulated count associated with the same input line is present in the timing means; and line address means for producing line identifying signals designating the particular input line associated with said accumulated count read out of the digit counting means;

whereby the readout means produces a count of the number of pulses at the second level occurring on an input line prior to a period at the first level sufficiently long for the timing means to accumulate a count eqaul to said predetermined count.

11. Apparatus in accordance with claim 10 including track means for storing an active indication or an inactive indication associated with each input line;

said track means enabling said first, second, third, and fourth logic means to be operable with respect to an input line when an active indication associated with the same input line is stored in the track means and preventing said first, second, third, and fourth logic means from being operable with respect to an input line when an inactive indication associated with the same input line is stored in the track means;

said signal processing means includes fifth logic means operable to cause the track means to store an active indication associated with an input line in response to the presence at the multiplexing means output of a sample at the first level associated with the same input line when the most recent sample associated with the same input line stored in the sample memory means is at the second level, said first logic means being operable to clear the timing means of the accumulated count therein associated with an input line in response to the presence at the multiplexing means output of a sample at the second level associated with the same input line when the most recent sample associated with the same input line stored in the sample memory means is at the first level, sixth logic means operable to cause said timing means to record a count associated with an input line in response to the presence at the multiplexing means output of a sample at the second level associated with the same input line when the most recent sample associated with the same input line stored in the sample memory means is at the second level and an active indication associated with the same input line is stored in the track means, and seventh logic means operable to clear the digit counting means of the accumulated count therein associated with an input line and to cause the track means to store an inactive indication associated with the same input line when a predetermined accumulated count associated with the same input line is present in the timing means.

12. Apparatus in accordance with claim 11 wherein said first logic means includes first logic flip-flop means operable when in a set condition to cause said digit counting means to record a count associated with an input line and to clear said timing means of the accumulated count therein associated with the same input line, and means coupled to said track means, said multiplexing means, said sample memory means, and said first logic flip-flop means and operable to place said first logic flip-flop means in the set condition in response to the presence at the multiplexing means output of a sample at the second level associated with an input line when the most recent sample associated with the same input line stored in the sample memory means is at the first level and an active indication associated with the same input line is stored in the track means.

said second logic means includes second logic flip-flop means operable when in a set condition to clear said timing means of the accumulated count therein associated with an input line, and means coupled to said track means, said multiplexing means, said sample memory means, and said second logic flip-flop means and operable to place said second logic flip-flop means in the set condition in response to the presence at the multiplexing means output of a sample at the first level associated with an input line when the most recent sample associated with the same input line stored in the sample memory means is at the second level and an active indication associated with the same input line is stored in the track means;

said logic means includes third logic flip-flop means operable when in a set condition to cause said timing means to record a count associated with an input line, and means coupled to said track means, said multiplexing means, said sample memory means, said digit counting means,, said timing means, and said third logic flip-flop means and operable to place said third logic flip-flop means in the set condition in response to the presence at the multiplexing means output of a sample at the first level associated with an input line when the most recent sample associated with the same input stored in the sample memory means is at the first level, a count associated with the same input line is present in the digit counting means, the accumulated count in the timing means associated with the same input line is less than said predetermined accumulated count, and an active indication associated with the same input line is stored in the track means;

said fourth logic means includes fourth logic flip-flop means operable when in a set condition to cause said readout means to read out the accumulated count associated with an input line in the digit counting means and subsequently to clear the digit counting means of the accumulated count therein associated with the same input line, and means coupled to said track means, said multiplexing means, said sample memory means, said digit counting means, said timing means, and said fourth logic flip-flop means and operable to place said fourth logic flip-flop means in the set condition in response to the presence at the multiplexing means output of a sample at the first level associated with an input line when the most recent sample associated with the same input line stored in the sample memory means is at the first level, a count associated with the same input line is present in the digit counting means, the accumulated count associated with the same input line in the timing means equals said predetermined count, and an active indication associated with the same input line is stored in the track means;

said fifth logic means includes fifth logic flip-flop means operable when in a set condition to cause the track means to store an active indication associated with an input line, and means coupled to said track means said multiplexing means, and said fifth logic flip-flop means and operable to place said fifth logic flip-flop means in the set condition in response to the presence at the multiplexing means output of a sample at the first level associated with an input line when an inactive indication associated with the same input line is stored in the track means;

said sixth logic means includes said third logic flip-flop means, and means coupled to said track means, said multiplexing means, said sample memory means, said timing means, and said third logic flip-flop means and operable to place the third logic flip-flop means in the set condition in response to the presence at the multiplexing means output of a sample at the second level associated with an input line when the most recent sample associated with the same input line stored in the sample memory means is at the second level, the count associated with the same input line in the timing means is less than said predetermined count, and an active indication associated with the same input line is stored in the track means;

said seventh logic means includes seventh logic flip-flop means operable when in a set condition to clear the digit counting means of the accumulated count therein associated with an input line and to cause the track means to store an inactive indication associated with the same input line, and means coupled to said track means, said multiplexing means, said sample memory means, said timing means, and said seventh logic flip-flop means and operable to place said seventh logic flip-flop means in the set condition in response to the presence at the multiplexing means output of a sample at the second level associated with an input line when the most recent sample associated with the same input line stored in the same memory means is at the second level, the accumulated count associated with the same input line in the timing means equals said predetermined count, and an active indication associated with the same input line is stored in the track means.

13. Apparatus in accordance with claim 12 including control means coupled to said track means, said multiplexing means, said sample memory means, said digit counting means, and said timing means and operable during the presence at the multiplexing means output of a sample associated with an input line to cause the track means to produce an indication associated with the same input line, to cause the sample memory means to produce the most recent sample associated with the same input line stored therein, to cause the digit counting means to produce the accumulated count therein associated with the same input line, and to cause the timing means to produce the accumulated count therein associated with the same input line;

first decision means coupled to said track means and operable to produce a signal at a first output in response to the track means producing an active indication and to produce a signal at a second output in response to the track means producing an inactive indication;

second decision means coupled to the second output of the first decision means and to the multiplexing means and operable to produce a signal at a first output when a sample at the first level is present at the multiplexing means output and a signal is present at the second output of the first decision means and to produce a signal at a second output when a sample at the second level is present at the multiplexing means output and a signal is present at the second output of the first decision means;

said fifth logic flip-flop means being connected to the first output of the second decision means and operable to be placed in the set condition when aa signal is present at the first output of the second decision means;

third decision means coupled to the first output of the first decision means and to the multiplexing means and operable to produce a signal at a first output when a sample at the first level is present at the multiplexing means output and a signal is present at the first output of the first decision means and to produce a signal at the second output when a sample at the second level is present at the multiplexing means output and a signal is present at the first output of the first decision means;

fourth decision means coupled to the second output of the third decision means and to the sample memory means and operable to produce a signal at a first output when the most recent sample produced by the sample memory means is at the first level and a signal is present at the second output of the third decision means and to produce a signal at a second output when the most recent sample produced by the sample memory means is at the second level and a signal is present at the second output of the third decision means;

said first logic flip-flop means being coupled to the first output of the fourth decision means and operable to be placed in the set condition when a signal is present at the first output of the fourth decision means.

fifth decision means coupled to the second output of the fourth decision means and to the timing means and operable to produce a signal at a first output when the accumulated count produced by the timing means equals said predetermined accumulated count and a signal is present at the second output of the fourth decision means and to produce a signal at a second output when the accumulated count produced by the timing means is less than said predetermined accumulated count and a signal is present at the second output of the fourth decision means;

said third logic flip-flop means being connected to the second output of the fifth decision means and operable to be placed in the set condition when a signal is present at the second output of the fifth decision means;

said seventh logic flip-flop means being connected to the first output of the fifth decision means and operable to be placed in the set condition when a signal is present at the first output of the fifth decision means;

sixth decision means coupled to the first output of the third decision means and to the sample memory means and operable to produce a signal at a first output when the most recent sample produced by the sample memory means is at the first level and a signal is present at the first output of the third decision means aand to produce a signal at the second output when the most recent sample produced by the sample memory means is at the second level and a signal is present at the first output of the third decision means;

said second logic flip-flop means being connected to the second output of the sixth decision means and operable to be placed in the set condition when a signal is present at the second output of the sixth decision means;

seventh decision means coupled to the first output of the sixth decision means and to the digit counting means and operable to produce a signal at a first output when a count is produced by the digit counting means and a signal is present at the first output of the sixth decision means and to produce a signal at a second output when no count is produced by the digit counting means and a signal is present at the first output of the sixth decision means;

eight decision means coupled to the first output of the seventh decision means and to the timing means and operable to produce a signal at a first output when the accumulated count produced by the timing means is equal to said predetermined accumulated count and a signal is present at the first output of the seventh decision means and to produce a signal at a second output when the accumulated count produced by the timing means is less than said predetermined accumulated count and a signal is present at the first output of the seventh decision means;

said third logic flip-flop means being connected to the second output of the eighth decision means and operable to be placed in the set condition when a signal is present at the second output of the eight decision means; and said fourth logic flip-flop means being connected to the first output of the eighth decision means and operable to be placed in the set condition when a signal is present at the first output of the eighth decision means.

14. Apparatus in accordance with claim 13 including enabling flip-flop means coupled to said first decision means and operable when in a set condition to enable said first decision means to produce a signal at one of said outputs;

said control means being operable to cause said multiplexing means to produce at the multiplexing means output a sample of the incoming signal associated with an input line during a sampling period;

said control means being operable during each sampling period while a sample is being produced by the multiplexing means to trigger said enabling flip-flop means to the set condition;

said control means being coupled to each of said logic flip-flop means and operable to trigger a logic flip-flop means connected to the output of a decision means having a signal thereon to the set condition during each sampling period subsequent to the triggering of the enabling flip-flop means to the set condition;

said control means being coupled to said sample memory means and operable during each sampling period subsequent to the triggering of a logic flip-flop means to the set condition to cause the sample memory means to store the sample produced during the sampling period in place of the previous most recent sample associated with the input line being sampled;

said first logic means including first logic gating means coupled to said first logic flip-flop means, said control means, said digit counting means, said timing means, and said enabling flip-flop means;

said second logic means including second logic gating means coupled to said second logic flip-flop means, said control means, said timing means, and said enabling flip-flop means;

said third logic means including third logic gating means coupled to said third logic flip-flop means, said control means, said timing means, and said enabling flip-flop means;

said fourth logic means including fourth logic gating means coupled to said fourth logic flip-flop means, said control means, said readout means, said digit counting means, said timing means, and said enabling flip-flop means;

said fifth logic means including fifth logic gating means coupled to said fifth logic flip-flop means, said control means, said track means, and said enabling flip-flop means;

said seventh logic means including seventh logic gating means coupled to said seventh logic flip-flop means, said control means, said digit counting means, said track means, and said enabling flip-flop means;

eighth logic means including eighth logic flip-flop means coupled to the second output of the second decision means and to the second output of the seventh decision means, and operable to be placed in a set condition when a signal is present at either the second output of the second decision means or the second output of the seventh decision means, and eighth logic gating means coupled to said eighth logic flip-flop means, said control means, and said enabling flip-flop means;

said enabling flip-flop means being operable when in a reset condition to reset each of said logic flip-flop means to a reset condition and to prevent said first decision means from producing a signal at either one of said outputs;

said control means being operable to produce a series of timing signals to said logic gating means during each sampling period subsequent to the triggering of a logic flip-flop means to the set condition;

said first logic gating means being operable in response to said timing signals from the control means when the first logic flip-flop means is in the set condition to cause said digit counting means to record a count associated with the input line being sampled, to clear said counting means of any accumulated count associated with the input line being sampled, and subsequently to reset said enabling flip-flop means to the reset condition;

said second logic gating means being operable in response to said timing signals from the control means when the second logic flip-flop means is in the set condition to clear said timing means of any accumulated count associated with the input line being sampled and subsequently to reset said enabling flip-flop means to the reset condition;

said third logic gating means being operable in response to said timing signals from the control means when the third logic flip-flop means is in the set condition to cause said timing means to record a count associated with the input line being sampled and subsequently to reset said enabling flip-flop means to the reset condition;

said fourth logic gating means being operable in response to said timing signals from the control means when the fourth logic flip-flop means is in the set condition to cause said readout means to read out the accumulated count being produced by said digit counting means, subsequently to clear said digit counting means of the count associated with the input line being sampled, to clear said timing means of any count associated with the input line being sampled, and subsequently to reset said enabling flip-flop means to the reset condition;

said fifth logic gating means being operable in response to said timing signals from the control means when the fifth logic flip-flop means is in the set condition to cause an active indication associated with the input line being sampled to be stored in the track means and subsequently to reset said enabling flip-flop means to the reset condition;

said seventh logic gating means being operable in response to said timing signals from the control means when the seventh logic flip-flop means is in the set condition to clear said digit counting means of any count associated with the input line being sampled, to cause an inactive indication associated with the input line being sampled to be stored in the track means, and subsequently to reset said enabling flip-flop means to the reset condition; and said eighth logic gating means being operable in response to said timing signals from the control means when the eighth logic flip-flop means is in the set condition to reset said enabling flip-flop means to the reset condition.

* * * * *